(12) United States Patent
Schroers et al.

(10) Patent No.: US 8,916,087 B2
(45) Date of Patent: Dec. 23, 2014

(54) METHOD OF BLOW MOLDING A BULK METALLIC GLASS

(75) Inventors: Jan Schroers, Hamden, CT (US);
Thomas Mackenzie Hodges, North Haven, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 12/744,161

(22) PCT Filed: Nov. 26, 2008

(86) PCT No.: PCT/US2008/084905
§ 371 (c)(1),
(2), (4) Date: Dec. 13, 2010

(87) PCT Pub. No.: WO2009/070701
PCT Pub. Date: Jun. 4, 2009

(65) Prior Publication Data
US 2011/0079940 A1    Apr. 7, 2011

Related U.S. Application Data

(60) Provisional application No. 60/990,109, filed on Nov. 26, 2007.

(51) Int. Cl.
B29C 49/08 (2006.01)
C22C 16/00 (2006.01)

(52) U.S. Cl.
CPC ........................... *C22C 16/00* (2013.01)
USPC .......................................... 264/535

(58) Field of Classification Search
USPC .......................................... 264/535
See application file for complete search history.

(56) References Cited

U.S. PATENT DOCUMENTS

| | | | |
|---|---|---|---|
| 5,032,196 A | | 7/1991 | Masumoto et al. |
| 5,158,817 A | * | 10/1992 | Krishnakumar ........... 428/36.92 |
| 5,288,344 A | | 2/1994 | Peker et al. |
| 5,368,659 A | | 11/1994 | Peker et al. |

(Continued)

FOREIGN PATENT DOCUMENTS

| | | |
|---|---|---|
| JP | 3805601 | 2/2006 |
| WO | WO 2004/059019 | 7/2004 |
| WO | WO 2009/070701 | 6/2009 |
| WO | WO 2009/070701 A1 | 6/2009 |

OTHER PUBLICATIONS

Schroers et al., Blow molding of bulk metallic glass. Scripa Materialia, vol. 57, Issue 4, pp. 341-344, Aug. 2007.*

(Continued)

*Primary Examiner* — Larry Thrower
(74) *Attorney, Agent, or Firm* — McCarter & English, LLP

(57) ABSTRACT

A very low pressure gas or blow forming process for shaping a bulk metallic glass (BMG) in its supercooled liquid state that avoids the fractional stick forces experienced by conventional shaping techniques by engineering the expansion of a pre-shape or parison of BMG material such that substantially all of the lateral strain required to form the final article is accomplished prior to the outer surface of the parison contacting the surface of the shaping apparatus is provided. The capability offered by the inventive shaping process to avoid the frictional forces exerted by the shaping apparatus surface allows for the formation of precision net-shape complex multi-scale parts and components using processing conditions inaccessible by conventional processes.

44 Claims, 23 Drawing Sheets

(56) References Cited

U.S. PATENT DOCUMENTS

| | | | |
|---|---|---|---|
| 5,618,359 | A | 4/1997 | Lin et al. |
| 5,735,975 | A | 4/1998 | Lin et al. |
| 6,027,586 | A * | 2/2000 | Masumoto et al. ............ 148/561 |
| 6,325,868 | B1 | 12/2001 | Kim et al. |
| 6,464,557 | B1 | 10/2002 | Ohba et al. |

OTHER PUBLICATIONS

Pearson, The Viscous Properties of Extruded Eutectic Alloys of Lead-Tin and Bismuth-Tin, Journal of the Institute of Metals, 54, 111-124, 1934.
Backofen, et al., Superpllasticity, JOM—Journal of Metals, 16, 763, 1964.
Leamy, et al., Plastic Flow and Fracture of Metallic Glass, Metallurgical Transactions, 3, 699-708, 1972.
Pampillo, et al., Comprehensive Plastic Deformation of a Bulk Metallic Glass, Materials Science and Engineering, 13, 181-188, 1974.
Patterson, et al., Moulding of a Metallic Glass, Materials Research Bulletins, 13, 583-585, 1978.
Argon, Plastic Deformation in Metallic Glasses, Acta Metallurgica, 27, 47-58, 1979.
Urlmann, et al., Glass: Science and Technology, Contents page, Academic Press, New York, 4 pages, 1990.
Muccio, Plastic Part Technology, Contents, ASM International, Materials Park, OH, 5 pages, 1991.
Zhang, et al., Production of Amorphous Alloy Balloons by Utilizing Viscous Flowability, Science Reports of the Research Institutes Tohoku University Series A—Physics Chemistry and Metallurgy, 36, 261-271, 1992.
Kawamura, et al., Full Strength Compacts by Extrusion of Glassy Metal Powder at the Supercooled Liquid State, Applied Physics Letters, 67, 2008-2010, 1995.
Inoue et al., Bulk Amorphous Alloys With High Mechanical Strength and Good Soft Magnetic Properties in Fe-TM-B (TM=IV-VIII Group Transition Metal) System, Applied Physics Lettter, 71, 464-466, 1997.
Johnson, Bulk Glass-Forming Metallic Alloys: Science and Technology, Mrs Bulletin, 24, 42-56, 1999.
Nishiyama, et al., Glass Transition Behavior and Viscous Flow Working of $Pd_{40}Cu_{30}Ni_{10}P_{20}$ Amorphous Alloy, Materials Transactions Jim, 40, 64-71, 1999.
Busch, The Thermophysical Properties of Bulk Metallic Glass-Forming Liquids, JOM—Journal of the Minerals Metals & Materials Society, 520, 39-42, 2000.
Hays et al., Microstructure Controlled Shear Band Pattern Formation and Enhanced Plasticity of Bulk Metallic Glasses Containing in situ Formed Ductile Phase Dendrite Dispersions, Physical Review Letters, 84, 29012904, 2000.
Saotome, et al., Superplastic Nanoforming of Pd-Based Amorphous Alloy, Scripta Materialia, 44, 1541-1545, 2001.
Saotome, et al., The Micro-Formability of Zr-Based Amorphous Alloys in the Supercooled Liquid State and Their Application to Micro-Dies, Journal of Materials Processing Technology, 113, 64-69, 2001.
Schroers, et al., Transition From Nucleation Controlled to Growth Controlled Crystallization in $Pd_{43}$ $Ni_{10}Cu_{27}P_{20}$ Melts, Acta Materialia, 49(14), 2773-2781, 2001.
Shen et al., Bulk Glass $Co_{43}Fe_{20}Ta_{5.5}$ $B_{31.5}$ Alloy with High Glass-Forming Ability and Good Soft Magnetic Properties, Materials Transactions, The Japan Institute of Metals, 42, 2136-2139, 2001.
Sordelet, et al., Synthesis of $Cu_{47}Ti_{34}Zr_{11}Ni_8$ Bulk Metallic Glass by Warm Extrusion of Gas Atomized Powders Journal of Materials Research, 17, 186-198, 2002.
Conner et al., Shear Bands and Cracking of Metallic Glass Plates in Bending, Journal of Applied Physics, 94, 904-911, 2003.
Swiston, et al., Joining Bulk Metallic Glass Using Reactive Multilayer Foils, Scripta Materialia, 48(12), 1575-1580, 2003.
Waniuk, et al., Timescales of Crystallization an dViscous Flow of the Bulk Glass-Forming Zr-Ti-Ni-Cu-Be Alloys, Physical Review, 67(18):, 184203-1-184203-9, 2003.
Karaman, et al., The Effect of Temperature and Extrusion Speed on the Consolidation of Zirconium-Based Metallic Glass Powder Using Equal-Channel Angular Extrusion, Metallurgical and Materials Transactions A—Physical Metallurgy and Materials Science, 35A, 247-256, 2004.
Schroers, et al., Ductile Bulk Metallic Glass, Physical Review Letters, 93, 255506-1-255506-4, 2004.
Schroers, et al., Highly Processable Bulk Metallic Glass-Forming Alloys in the Pt-Co-Ni-Cu-P System, Applied Physics Letters, 84, 3666-3668, 2004.
Schroers, et al., Synthesis Method for Amorphous Metallic Foam, Journal of Applied Physics, 96, 7723-7730, 2004.
Schroers, The Superplastic Forming of Bulk Metallic Glasses, JOM—Journal of Metals, 57, 35-39, 2005.
Schroers, et al., Gold Based Bulk Metallic Glass, Applied Physics Letters, 87, 61912-1-61912-, 2005.
Soejima, et al., Viscous Flow Forming of Zr-Based Bulk Metallic Glasses for Industrial Products, Journal of Metastable and Nanocrystalline Materials, 24, 531-534, 2005.
Swiston, et al., Thermal and Microstructural Effects of Welding Metallic Glasses by Self-Propagating Reactions in Multilayer Foils, Acta Materialia, 53(13):, 3713-3719, 2005.
Zhang, et al., Amorphous Metallic Plastic, Physical Review Letters, 94, 205502-1-205502-4, 2005.
Ashby, et al., Metallic Glasses as Structural Materials, Scripta Materialia, 54, 321-326, 2006.
Hufnagel, Preface to the Viewpoint Set on Mechanical Behavior of Metallic Glasses, Scripta Materialia, 54, 317-319, 2006.
Kim, et al., Superplastic Gas Pressure Forming of $Zr_{65}Al_{10}Ni_{10}Cu_{15}$ Metallic Glass Sheets Fabricated by Squeeze Mold Casting, Materials, Science and Engineering A—Structural Materials Properties Microstructure and Processing, 428, 205-210, 2006.
Schroers, et al., Amorphous Metal Alloys Form Like Plastics: The Lack of Long-Range Periodicity and Related Grain Boundaries in Amorphous Metals Gives Rise to Many Novel Properties, Including Ultrahigh Strength, Improved Corrosion Resistance, and Attractive Magnetic Properties, Advanced Materials & Processes, 164, 61-63, 2006.
Kundig, et al., Metallic Glass/Polymer Composites by Co-Processing at Similar Viscosities, Scripta Materialia, 56, 289-292, 2007.
Liu, et al., Super Plastic Bulk Metallic Glasses at Room Temperature, Science, 315, 1385-1388, 2007.
Schroers, et al., Thermoplastic Forming of Bulk Metallic Glass—A Technology for Mems and Microstructure Fabrication, J. Mems, 16, 240-247, 2007.
Schroers, et al., A Novel Metallic Glass Composite Synthesis Method, Scripta Materialia, 56, 177-180, 2007.
Schroers, et al., Blow Molding of Bulk Metallic Glass, Scripta Materialia, 57, 341-344, 2007.
Schroers, On the Formability of Bulk Metallic Glass in its Supercooled Liquid State, Acta Materialia, 56, 471-478, 2008.
U.S. Appl. No. 13/952,906, filed Nov. 21, 2013, Schroers; Jan; et al.
Kalpakjian, Serope, Manufacturing Engineering and Technology, Reading, Massachusetts, Addison-Wesley Publishing Company, 1995, pp. 275, 281, 282, 535, 537, 539 and 540.
PCT International Search Report and Written Opinion dated Feb. 2, 2009.

* cited by examiner a      b

FREE EXPANSION
~1000% STRAIN front back

US 8,916,087 B2

METHOD OF BLOW MOLDING A BULK METALLIC GLASS

RELATED APPLICATIONS

This application is a national stage application filed under 35 USC 371 of PCT/US2008/084905, filed Nov. 26, 2008, which claims the benefit of U.S. Provisional Patent Application Ser. No. 60/990,109, filed Nov. 26, 2007, all of which are incorporated herein, in entirety, by reference.

FIELD OF THE INVENTION

This invention relates generally to an improved method of blow-molding complex and thin-walled articles formed of bulk metallic glass materials; and more particularly to a method of blow-molding bulk metallic glass materials including the provision of pre-shaped parisons specifically designed to improve the ability to controllably conform the bulk metallic glass material to the contour of the mold being reproduced and/or control wall thickness.

BACKGROUND OF THE INVENTION

For centuries it has been known that glassy materials can be formed under very low forming pressures, including pressures achievable solely with the human lung when heated above its softening temperature. (See, e.g., D. R. Uhlmann & N. J. Kreidl, Glass: Science and Technology, Academic Press, New York, 1990, the disclosure of which is incorporated herein by reference.) Decades ago this observation was expanded, and it was recognized that synthetic plastics could be processed in a similar manner. (See, e.g., E. A. Muccio, Plastic Part Technology, ASM International, Materials Park, Ohio, 1991, the disclosure of which is incorporated herein by reference.) Blow molding became the terminology used to collectively describe a number of different techniques for plastic processing that allow the net-shaping of complex geometries consisting of thin sections with a vast aspect ratio.

In a separate development, superplastically formable (SPF) metallic alloys were discovered, which exhibited plastic deformations far beyond the plasticities normally associated with metals, which were usually expected to be less than 10-25%. Indeed, when stable two-phase microstructures with grain sizes of less than 10 μm were processed in an environment, where the temperature was around 0.5 Tm, and at the same time subjected to gas pressures of up to 5 MPa in a controlled manner, outstanding plasticities of ~500% were observed. (See, e.g., C. E. Pearson, Journal of the Institute of Metals 54 (1934) 111-124; and W. A. Backofen, I. R. Turner, D. H. Avery, JOM—Journal of Metals 16 (1964) 763, the disclosures of which are incorporated herein by reference.)

Despite the improved properties shown by these SPF alloys, the flow stresses involved in shaping them are still significantly higher than those in plastic or glass at their respective processing temperatures. Recently a new class of materials referred to as bulk metallic glasses (BMGs) have been developed that show a number of attractive properties, including very high strength, elasticity, and corrosion resistance. (See, e.g., W. L. Johnson, Mrs Bulletin 24 (1999) 42-56; T. C. Hufnagel, Scripta Materialia 54 (2006) 317-319; and M. F. Ashby, A. L. Greer, Scripta Materialia 54 (2006) 321-326, the disclosures of which are incorporated herein by reference.) In addition, these materials can be cooled at cooling rates of about 500 K/sec or less from their molten state to form objects of 1.0 mm or more thickness with substantially amorphous atomic structure. (See, e.g., U.S. Pat. Nos. 5,288, 344; 5,368,659; 5,618,359; and 5,735,975, the disclosures of which are each incorporated by reference herein.) That these BMG alloys may be formed into articles that are substantially thicker than conventional amorphous alloys, which have typical processes thicknesses of ~0.020 mm and which require cooling rates of $10^5$ K/sec or more, gives rise to a wide-variety of potential bulk applications. However, with a few exceptions BMGs have shown no or very limited plasticity. (See, e.g., J. Schroers, W. L. Johnson, Physical Review Letters 93 (2004) 255506; and Y. H. Liu, et al., Science 315 (2007) 1385-1388, the disclosures of which are incorporated herein by reference.) This in turn has limited the applications to which BMGs may be applied. (See, M. F. Ashby & A. L. Greer, Scripta Materialia 54 (2006) 321-326, the disclosure of which is incorporated herein by reference.)

Despite this significant limitation, it has been recognized that in small dimensions BMGs can show significant plasticity. For example, Conner et al. have shown that the plasticity of BMG beams in bending increases significantly when the beam thickness is decreased below 1 mm. (See, R. D. Conner, et al., Journal of Applied Physics 94 (2003) 904-911, the disclosure of which is incorporated herein by reference.) Also, it was observed that for the majority of BMGs the plastic zone shielding a crack tip is less than 1 mm. (See, M. F. Ashby & A. L. Greer, Scripta Materialia 54 (2006) 321-326, the disclosure of which is incorporated herein by reference.) These results suggest that an ideal geometry for BMG applications should be limited in at least one dimension to below 1 mm for BMGs to express their full potential properties. As a result, to date the geometries achievable with the vast majority of BMGs have been quite limited.

Currently, two fundamentally different processing routes are used to shape BMGs. (J. Schroers, JOM—Journal of Metals 57 (2005) 35-39, the disclosure of which is incorporated herein by reference.) The first is direct casting or molding, where the BMG is simultaneously fast cooled to avoid crystallization during solidification and filled or pressed into the entire mold cavity. The coupling of the forming and cooling steps in these techniques makes the production of thin sections with high aspect ratio particularly challenging. Indeed, only a careful balance of process parameters makes this process at all commercially useful, and even then it is only usable for a very limited number of geometries. (See, J. Schroers & N. Paton, Advanced Materials & Processes 164 (2006) 61-63, the disclosure of which is incorporated herein by reference.)

The second processing technique, broadly referred to as plastic forming, takes advantage of the sluggish crystallization kinetics found in BMGs to decouple the forming and cooling steps. Specifically, the unique kinetics of BMGs result in a supercooled liquid region. In this temperature region the BMG first relaxes during heating from room temperature at the glass transition into a supercooled liquid before it eventually crystallizes at the crystallization temperature, the upper bound of the supercooled liquid region. (See, Busch, R., Jom—Journal of the Minerals Metals & Materials Society, 2000. 52(7): p. 39-42, the disclosure of which is incorporated herein by reference.) For some BMGs the, temperatures and flow stress for plastic forming are comparable to plastics. (See, e.g., J. Schroers, & N. Paton, Advanced Materials & Processes 164 (2006) 61-63; J. Schroers & W. L. Johnson, Applied Physics Letters 84 (2004) 3666-3668; J. Schroers, et al., Applied Physics Letters 87 (2005) 61912; and B. Zhang, et al., Physical Review Letters 94 (2005), the disclosures of which are incorporated herein by reference.) Within this temperature window some BMGs can exist as viscous liquids with viscosities below $10^6$ Pa s at time scales of several minutes. (See, Waniuk, T., et al., Physical Review B, 2003. 67(18): p. 184203, the disclosure of which is incorporated herein by reference.) This processing window provides unique processing opportunities, including using techniques typically reserved for plastics. (See, J. Schroers, JOM—Journal of Metals 57 (2005) 35-39, the disclosure of which is incorporated herein by reference.)

The ability to plastically form BMGs in their supercooled liquid region was recognized in the early days of metallic glass research and various terminologies are used, including superplastic forming, thermoplastic forming and hot-forming. (See, e.g., See, e.g., H. J. Leamy, et al., Metallurgical Transactions 3 (1972) 699; C. A. Pampillo & H. S. Chen, Materials Science and Engineering 13 (1974) 181-188; Patterson and Jones, Materials research Bulletins, 13 (1978) 583, the disclosures of which are incorporated herein by reference.) This processing opportunity has been used for a wide range of applications, including net-shape processing, micro- and nanoreplication, extrusion, synthesis of amorphous metallic foams, superplastic forming of sheet material, and synthesis of BMG composites. (See, e.g., N. Nishiyama & A. Inoue, Materials Transactions Jim 40 (1999) 64-71; Y. Saotome, et al., Scripta Materialia 44 (2001) 1541-1545; Y. Saotome, et al., Journal of Materials Processing Technology 113 (2001) 64-69; J. Schroers, et al., J. Mems 16 (2007) 240; Y. Kawamura, et al., Applied Physics Letters 67 (1995) 2008-2010; D. J. Sordelet, et al., Journal of Materials Research 17 (2002) 186-198; I. Karaman, et al., Metallurgical and Materials Transactions A—Physical Metallurgy and Materials Science 35A (2004) 247-256; J. Schroers, et al., Journal of Applied Physics 96 (2004) 7723-7730; T. Zhang, et al., Science Reports of the Research Institutes Tohoku University Series A—Physics Chemistry and Metallurgy 36 (1992) 261-271; W. J. Kim, et al., Materials Science and Engineering A—Structural Materials Properties Microstructure and Processing 428 (2006) 205-210; H. Soejima, et al., Journal of Metastable and Nanocrystalline Materials 24 (2005) 531; J. Schroers, et al., Scripta Materialia 56 (2007) 177-180; and A. A. Kundig, et al., Scripta Materialia 56 (2007) 289-292, the disclosure of which are incorporated herein by reference.) However, even though during plastic forming of BMGs fast cooling and forming are decoupled, thin section articles with a high aspect ratio are challenging to create when using techniques where the BMG is in physical contact with the mold. This is due to stick conditions between the BMG and the mold under plane-strain conditions, which retards radial movement (parallel to the mold) of the BMG. For example, when considering the thermoplastic forming technique shown in FIG. 1a, an attempt to expand a flat disc of BMG between the platens in the supercooled liquid regime is limited. The reason for this stems from the fact that friction between the mold and the BMG at the contact surface opposes the deformation and an incommensurably higher forming pressure is required compare to the early stages where the required forming pressure solely has to overcome the flow stress (See FIG. 1b). For example, when deforming a cylinder of BMG forming alloy $Zr_{44}Ti_{11}Cu_{10}Ni_{10}Be_{25}$ having a diameter of 11 mm into a flattened disc of 60 mm diameter at 440° C., a pressure of 30 MPa is necessary, however the flow stress absent frictional forces is only 0.3 MPa.

This effect can be reduced to some degree by using lubricants, which results in some slippage. However, the improvement is quite limited and the use of lubricants sacrifices the otherwise excellent achievable surface finish.

In short, BMGs, when properly formed from the molten state at sufficiently fast cooling rates, have high elastic limits, typically in the range of from 1.8% to 2.2%. Further, these amorphous alloys may show substantial bending ductility of up to 100%, such as in the case of thin melt spun ribbons. In addition, amorphous alloys being capable of showing glass transition are further capable of forming a super-cooled liquid above the glass transition range and can be significantly deformed using very small applied pressure (normally, 20 MPa or less). However, despite these desirable physical properties and the large inherent formability of some BMGs, under currently available shaping techniques shapes which are requiring high strains are simply not accessible.

In essence, the prior art methods of shaping articles of BMG do not allow for the utilization of the full range of formability characteristics because these methods each require that the BMG make contact with the shaping apparatus during the majority of time required for the forming operation. Accordingly, a new and improved method for forming articles of BMGs, which allows for the full access to the processing characteristics of these materials, is needed.

BRIEF SUMMARY OF THE INVENTION

Thus, there is provided in the practice of this invention according to a presently preferred embodiment, a method of shaping a bulk metallic glass using a very low pressure gas or blow forming process that avoids the frictional stick forces experienced by conventional shaping techniques by engineering the expansion of a pre-shape or parison of BMG material such that substantially all of the lateral strain required to form the final article is accomplished prior to the outer surface of the parison contacting the surface of the shaping apparatus. In one such embodiment, at least 90% of the local lateral strain of any portion of the parison has been accomplished prior to that portion of the parison making contact with the mold.

In one embodiment, the shape or outer contour of the preformed parison is designed to ensure that substantially all of the local lateral strain experienced by any portion of the inner surface of the parison during expansion occurs prior to this portion of the outer face of the parison coming into contact with the mold. In such an embodiment, the shape of the parison may be designed to control the thickness of the walls of the final part, such as, for example to ensure that the thicknesses of the walls of the final part are approximately uniform. In one such embodiment, the contour of the parison should be designed to match the final contour of the mold such that the overall strain of the parison is greater than 70% before any part of the BMG materials touches the mold.

In another embodiment, the cross-sectional thickness of the preformed parison is designed to ensure that substantially all of the local lateral strain experienced by any portion of the inner surface of the parison during expansion occurs prior to this portion of the outer face of the parison coming into contact with the mold. In such an embodiment, the cross-sectional thickness of the parison may be designed to control the thickness of the walls of the final part, such as, for example to ensure that the thicknesses of the walls of the final part are approximately uniform.

In still another embodiment, the parison is differentially heated such that the parison expands non-uniformly to ensure that substantially all of the local lateral strain experienced by any portion of the inner surface of the parison during expansion occurs prior to this portion of the outer face of the parison coming into contact with the mold. In such an embodiment, the differential heating of the parison may be designed to control the thickness of the walls of the final part, such as, for example to ensure that the thicknesses of the walls of the final part are approximately uniform.

In yet another embodiment, differential stresses are applied at a plurality of points along the parison to control the thickness of the walls of the final article. In such an embodiment, the differential stresses are designed to ensure that the thicknesses of the walls of the final article are approximately uniform. In another such embodiment, the differential stresses are applied via a plurality of gas outlets disposed in fluid communication with the parison.

In still yet another embodiment, the strain rate in the parison during expansion is sufficiently low to ensure Newtonian flow of the bulk metallic glass material. In such an embodiment, the pressure differential is formed by exposing one face of the parison to atmospheric pressure and exposing the other face of the parison to a vacuum of less than about $10^4$ Pa. Alternatively, the pressure differential may be formed by exposing one face of the parison to atmospheric pressure and exposing the other surface of the parison to a pressure of less than about 3 MPa. In yet another alternative the pressure differential is formed by exposing one face of the parison to a pressure of less than about $10^4$ Pa and exposing the other surface of the parison to a pressure of less than about 3 MPa.

In still yet another embodiment, the bulk metallic glass material is chosen such that it has a viscosity when heated to within the supercooled liquid temperature region such that a flow stress of less than about 3 MPa may be used to achieve overall lateral strains of at least 100% prior to crystallization. Alternatively, it is preferred that the bulk metallic glass material has a viscosity within the supercooled liquid temperature region that can be accessed for at least one minute before crystallization of less than about $10^8$ Pa·s, more preferably less than about $10^7$ Pa·s, and even more preferably less than about $10^6$ Pa·s.

In still yet another embodiment, the forming time of method of the invention is at least 5 seconds, and the processing time including cooling and heating is at least 30 seconds.

In still yet another embodiment, the overall lateral strain during expansion exceeds 100% prior to the outer face contacting the mold, and preferably exceeds 500% prior to the outer face contacting the mold.

In still yet another embodiment, the final article is cooled at a rate of less than about 10° C./sec to reduce tempering stresses, and in some extreme cases where stresses are of highest concern even slower rate can be used to basically eliminate tempering stresses. In such cases the cooling rate can be as slow as 0.3 C/sec.

In still yet another embodiment, the invention is directed to an article formed in accordance with the current invention. In one such embodiment, the final article has at least one characteristic selected from the group consisting of hollow bodied, containing undercuts, has a non-uniform cross section, and reproduces features on multiple length scales. In another such embodiment, the final article has a wall thickness that is less than 1 mm, or alternatively a wall thickness that is less than 1/40 of the lateral dimension of the final part.

In still yet another embodiment, the BMG material has incorporated into it a non-BMG article (or a different BMG). In such an embodiment, the non-bulk metallic glass part is designed to functionalize the surface of the final part.

In another such embodiment the incorporation is used to join the bulk metallic glass to a non-bulk metallic glass material. In yet another such embodiment, the non-bulk metallic glass material is a gemstone. In still another such embodiment the non-bulk metallic glass material is a hard material such as a carbide, diamonds, nitrides, or refractory metals. In still yet another such embodiment, the non-bulk metallic glass material is one that improves wear and/or improves lubrication. In still yet another embodiment, the non-bulk metallic glass material is one of either carbon or a polymer.

In another such embodiment, the incorporation is used to gas pressure form threads or locator holes/pins into the bulk metallic glass material of the final part.

In still yet another embodiment, the method of the current invention also allows for the reproduction of the surface features of the internal cavity of the mold. In such an embodiment, normal strain applied to the parison upon contact with the walls of the internal cavity of the mold is sufficient to ensure reproduction of the surface features. In one such embodiment at least an additional 50% local normal strain is applied to the parison upon contact with the walls of the internal cavity of the mold to ensure reproduction of the surface features. In such an embodiment, the surface features of the mold may have a size scale of less than about 10 μm.

In still yet another embodiment, the surface features molded into the final article are provided to make the surface of the final article optically active.

In still yet another embodiment, the internal cavity of the mold is made from a material selected from the group consisting of ceramic, plaster, polymer, glass, epoxy and other resins. In such an embodiment, the internal cavity of the mold may split apart to form a final article that is a seamless hollow part and/or has at least one undercut.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein.

DETAILED DESCRIPTION OF THE INVENTION

The current invention is directed to a very low pressure gas or blow forming process for shaping a bulk metallic glass (BMG) in its supercooled liquid state that avoids the frictional stick forces experienced by conventional shaping techniques by engineering the expansion of a pre-shape or parison of BMG material such that substantially all of the lateral strain required to form the final article is accomplished prior to the outer surface of the parison contacting the surface of the shaping apparatus. The capability offered by the inventive shaping process to avoid the frictional forces exerted by the shaping apparatus surface allows for the formation of precision net-shape complex multi-scale parts and components using processing conditions inaccessible by conventional processes.

Figure 2:
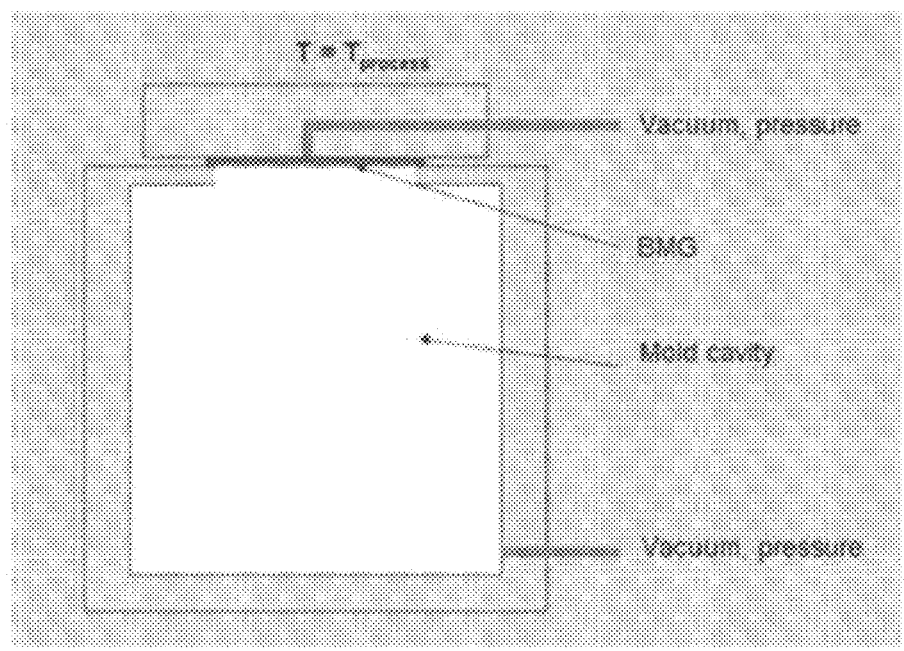
FIG. 2, provides a schematic of a conventional blow molding apparatus.

The basic gas pressure or blow molding shaping process used by the current invention is relatively straight-forward and will be explained with reference to the schematic of the exemplary gas pressure or blow molding set-up shown in FIG. 2. As shown, a disk shaped parison or pre-formed blank of BMG material is positioned over the opening to the inner cavity of a mold. The entire setup is heated to a processing temperature using, for example, resistance heating. Once the temperature of the BMG parison reaches the requisite shaping temperature a pressure gradient is applied between the two surfaces of the parison to force the BMG into the mold cavity. In this step the pressure gradient can be achieved either by applying pressure from the outer side of the parison, or by reducing the pressure in the mold cavity, or a combination of the two. Finally, releasing the pressure gradient terminates the forming process at which time the final article may be cooled.

Figure 3:
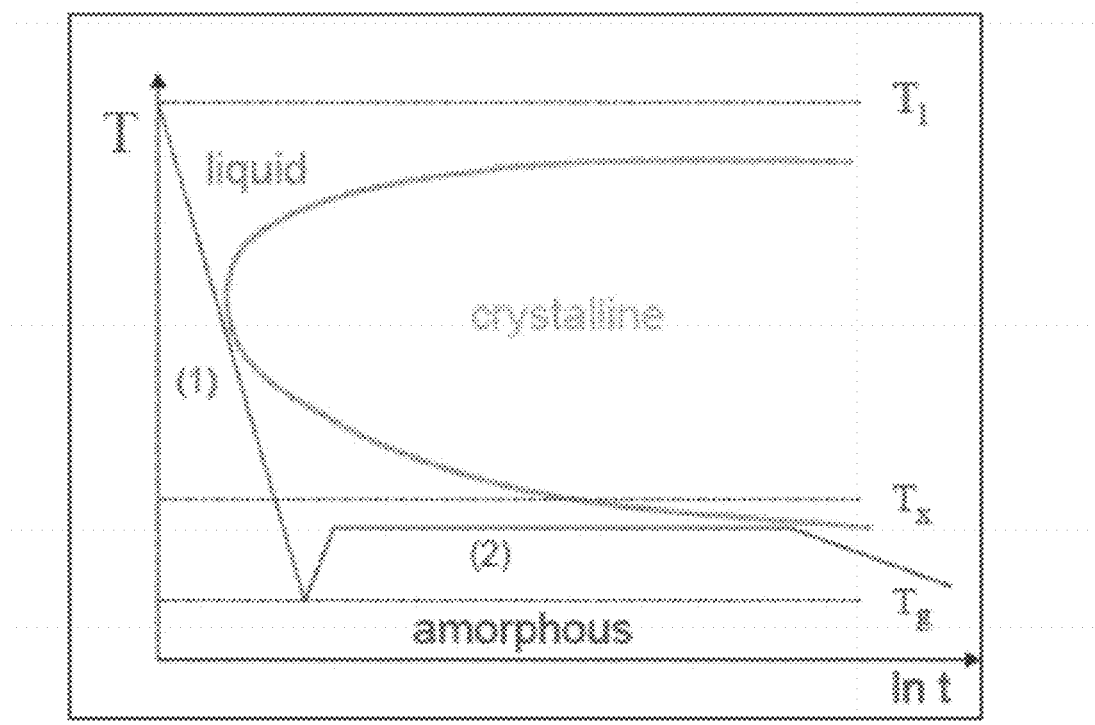
FIG. 3, provides a data graph of a model time-temperature-transformation diagram indicating the crystallization time.

As will be appreciated, there are several variables that may be adjusted in this basic blow molding technique, namely, the processing temperature of the shaping apparatus and parison, the pressure gradient used to expand the parison into the mold, and the location of the force vector of the pressure gradient. The current invention, like other thermoplastic forming techniques, takes advantage of the unique crystallization kinetics of BMGs to decouple the forming and cooling steps of the shaping process. Specifically, as shown in the model crystallization cooling curve provided in FIG. 3, BMGs have peculiarly sluggish crystallization kinetics, which result in the creation of a supercooled liquid region. A BMG may be placed into this supercooled liquid temperature region during heating from room temperature. When a BMG reaches its glass transition temperature it relaxes into a supercooled liquid before it eventually crystallizes at the crystallization temperature, the upper bound of the supercooled liquid region. Within this supercooled liquid temperature window these BMGs exist as liquids, and in some cases can be subjected deformational strains of greater than 10,000% even under forming pressures as low as $10^5$ Pa (see FIG. 4a, as discussed below). (See, e.g., Schroers J., et al., Scripta Materialia 2007; 57: 341-344, the disclosure of which is incorporated herein by reference.) Moreover, BMGs can be maintained in this supercooled liquid form at time scales that can last from minutes to hours, providing sufficient time to undertake any practical commercial shaping technique (see FIG. 4b as discussed below). (See, e.g., Waniuk, T., et al., Physical Review B, 2003. 67(18): p. 184203, the disclosure of which is incorporated herein by reference.)

Figure 4A:
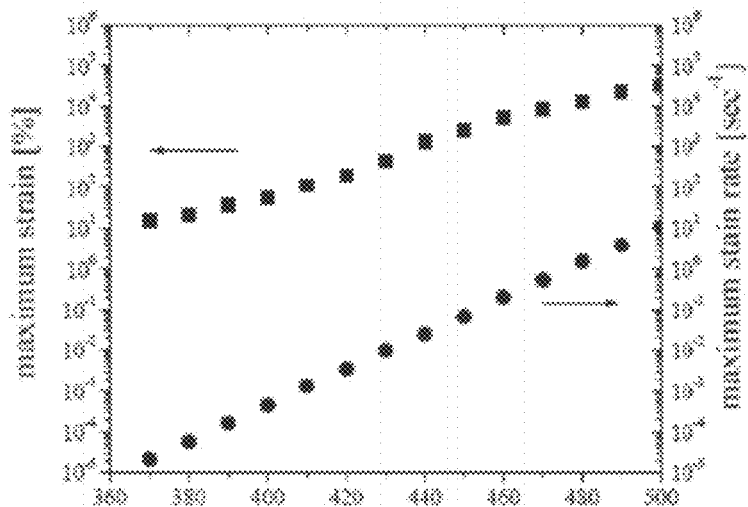
FIGS. 4a and 4b, provide data graphs of viscosity and crystallization time data for an exemplary BMG material.
Figure 4B:
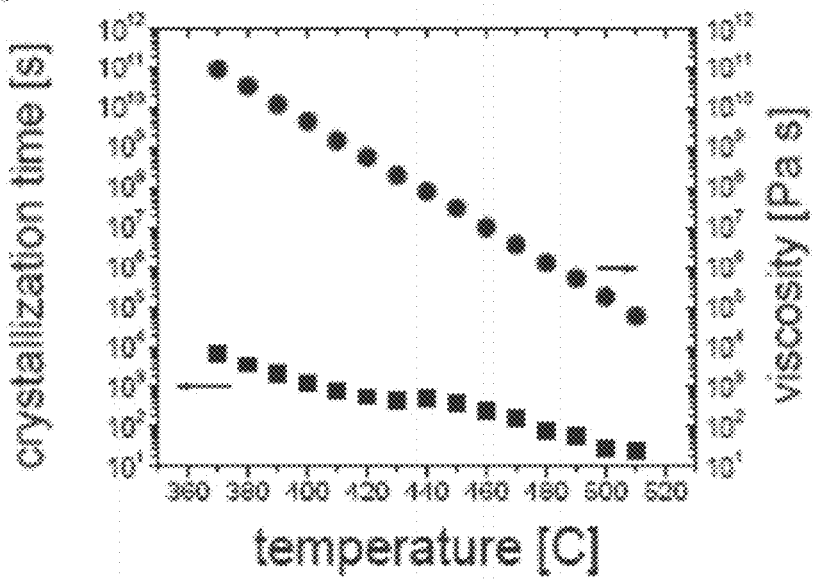

For example, viscosity and crystallization time data for an exemplary BMG ($Zr_{44}Ti_{11}Cu_{10}Ni_{10}Be_{25}$) is provided in FIGS. 4a and 4b. (Viscosity data used for the calculated values was taken from Waniuk et al., cited above.) The maximum strain rate and maximum strain as a function of temperature were calculated according to the following equations:

$$d/dt\ E_{max} = \sigma_{dia}/3\eta \qquad \text{EQ. 1}$$

and, $$E_{max} = \sigma_{dia}/3\eta \cdot t_{cryst} \qquad \text{EQ. 2}$$

where $E_{max}$ is the maximum strain, $\sigma_{dia}$ is the plane stress, $\eta$ is the viscosity, and $t_{cryst}$ is the crystallization time. As shown in FIG. 4b, for this exemplary alloy the maximum strain increases continuously with increasing forming temperature from 15% at 370° C. and a maximum strain rate of $2 \times 10^{-5}$ $s^{-1}$, to 32,200% at 500° C. and a maximum strain of 11 $s^{-1}$.

The increase in formability with increasing temperature stems from the fact that the temperature dependence of the viscosity of the material, as shown in FIG. 4a, is larger than the temperature dependence of the crystallization time. These results further confirm that large processing windows are available where very large deformations are achievable during blow molding with this exemplary BMG. For example, a commercially viable process typically requires an available process time between 100 and 1000 s, and strain rates between $10^{-2}$ $s^{-1}$ and 100 $s^{-1}$. The above calculations suggest that with the exemplary material such requirements would be fulfilled in a temperature window of from 430° C. to 480° C., where strains between ~400% and ~13,000% are achievable for several minutes.

Figure 1A:
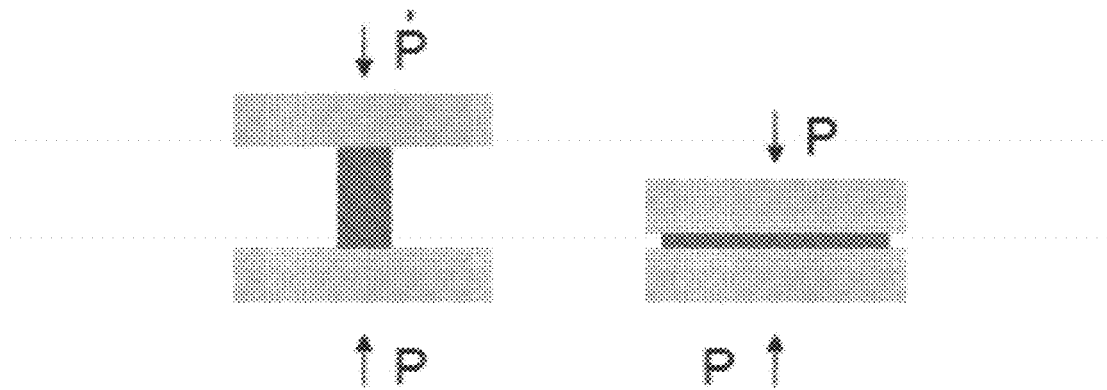
FIGS. 1a to 1b, provide a schematic of a conventional thermoplastic casting process (a), and a data graph showing the pressure required to form a BMG with increasing frictional forces.
Figure 1B:
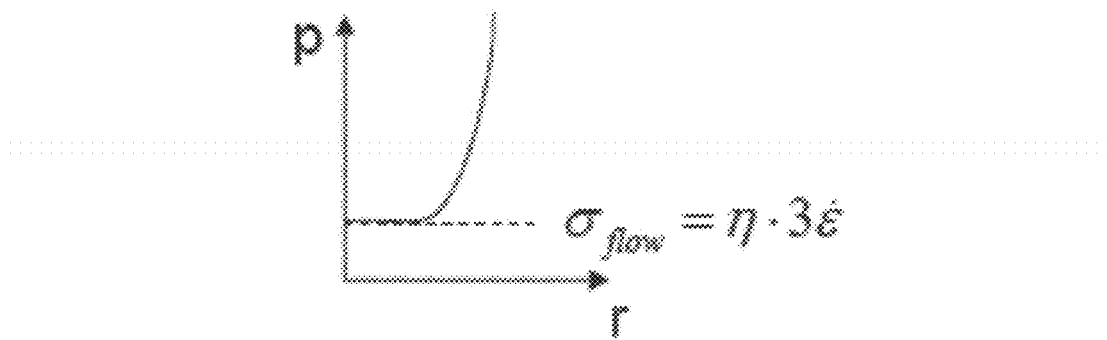

In summary, a blow molding of BMG materials in this supercooled liquid state can theoretically be used to form net-shape BMG articles having thin walls and large sections to a very high accuracy. Moreover, the low viscosity exhibited by some BMGs permits very large strains of up to 10,000% under very low forming pressures of $10^5$ Pa that can ensure the flow of the material as it expands is Newtonian. This suggests that article geometries that have been previously considered impractical, such as articles with large thin sections, including such articles that are further hollow and/or have undercuts would be feasible with such a technique. However, although a conventional blow molding technique can be used with some degree of success, it is simply not possible to access the full processability of these BMG materials. The reason for this, as discussed with reference to FIG. 1b, stems from the fact that once the BMG comes into physical contact with the surface of the shaping apparatus, whether that be a cast or mold, the amount of force required to deform the material laterally increases by two orders of magnitude or more until effectively no further expansion of the material contacting the walls of the shaping apparatus occurs absent inordinately high processing pressures.

Figure 5A:
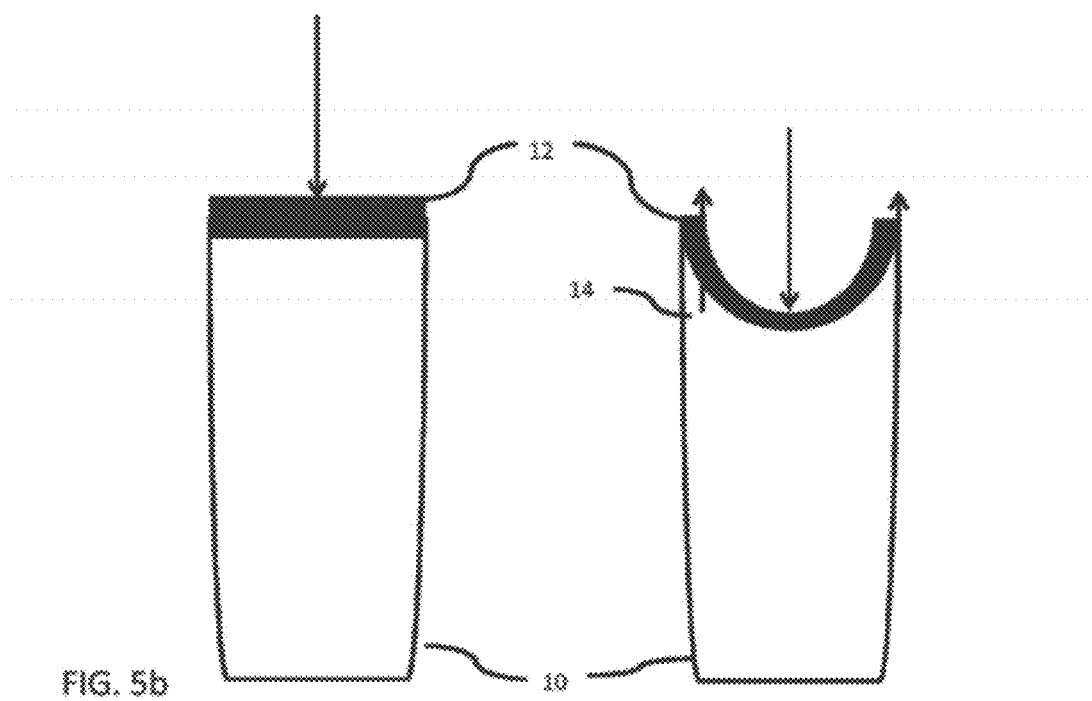
FIGS. 5a and 5b, provide a schematic diagram of a conventional blow molding process (a) and an image of a blow molded article after failure (b)
Figure 5B:
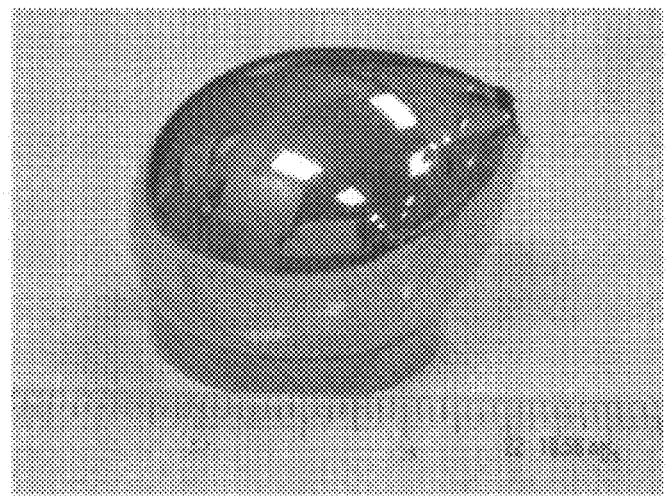

As shown in FIGS. 5a and 5b, one consequence of the non-uniform imposition of these frictional or stick stresses on the BMG is that the BMG material undergoes non-uniform strain or thinning as it is expanded into the mold. Specifically, as shown in FIG. 5a, as the BMG parison (12) is expanded into the mold (10) the portion in contact with the inner face (14) of the mold stops expanding while the free portion of the material continues to expand to fill the inner cavity of the mold. The reason for this differential expansion relates directly to the same challenges faced by conventional press molding or casting, namely, that when any portion of the expanding parison touches the wall of the shaping apparatus it experiences the type of stick conditions found in these conventional molding and casting techniques. These stick conditions retard any further radial deformation or lateral strain of the material, and the required pressure for any further deformation is incommensurably higher than for the portions of the parison that are not in contact with the mold. As can be appreciated, the portions of the parison that do not contact the walls of the mold will have dramatically lower cross-sectional thicknesses. The consequence of this non-uniform thinning is that portions of outer wall of the formed article become too thin, ultimately lose integrity, and fail, as shown in FIG. 5b. In short, the consequence of the unregulated contact between the parison and the shaping apparatus in these conventional blow molding techniques means that the amount of overall strain that can be imposed on the parison prior to failure is not commensurate with the actual formability of the material.

This limitation on the processing of BMGs using conventional forming techniques is best understood by examining the "strains" being put on the BMG material of the parison as it expands freely prior to contacting the walls of the shaping apparatus, and then the strains experienced by the material after making contact with the walls of the shaping apparatus. Specifically, there are a number of different ways of calculating the strains being experienced by a parison as it is expanded to form a final article. First, there is the "overall strain", which describes the total expansion experienced by the outer surface of the BMG material as the parison is formed into the final article. There are also measures of the local lateral and normal strains, which define specific directional strains experienced at specific points along the parison. The local lateral strain is the strain perpendicular to the force load direction experienced by a local volume of the parison (local volume being defined herein as an element that has a volume given by the produce of the thickness and a 3 mm by 3 mm surface area). This strain can be visualized by drawing square on the surface of the parison, how that square changes during the shaping process defines the local lateral strain felt by the material comprising that square. Finally, there is the "normal strain", which is the strain parallel to the force load direction experienced by any point or portion of the parison.

Figure 6:
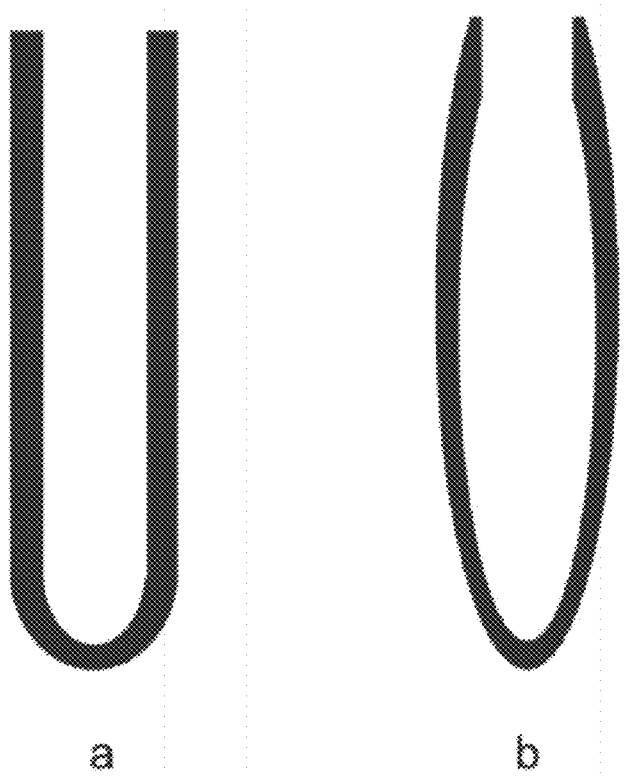
FIG. 6, schematic showing non-castable shape accessible via the process of the current invention.

In accordance with the current invention, the unique processing window and the peculiar forming attributes of supercooled liquid BMGs are utilized in a novel gas pressure/blow molding processing technique that eliminates the deleterious consequences of these stick forces by preventing physical contact between the BMG and the mold until substantially all of the lateral strain of the parison during expansion is accomplished. Using the gas pressure shaping process of the current invention it is possible to ensure that the required minimum pressure for forming is solely defined by the flow stress of the BMG without reference to these external stick forces, which in turn when utilizing the embodiment for controlling thickness distributions allows for the uniform or controlled expansion of the BMG parison to the maximum extent allowed by the material's expansive properties. As a result, the blow molding process of the current invention is designed to allow for the forming of BMGs into complex net-shape parts requiring very large overall strains of preferably at least 100% and even more preferably at least 500% prior to the expanding BMG material making contact with the mold, under very low forming pressures of $10^5$ Pa that can ensure the flow of the material as it expands is Newtonian, in processing windows of at least 60 s. It also allows for the creation of shapes that cannot be cast using conventional techniques, such as, for example, the shape labeled "b" shown in FIG. 6. Here an easily castable parison is blow molded into a shape that cannot be cast since the inner mold cannot be physically removed out of the cast shape, as would be the case with the shape labeled "a". Here the overall strain during blow molding might be as low as 10% but the shape would be impossible to make using conventional techniques.

Figure 7:
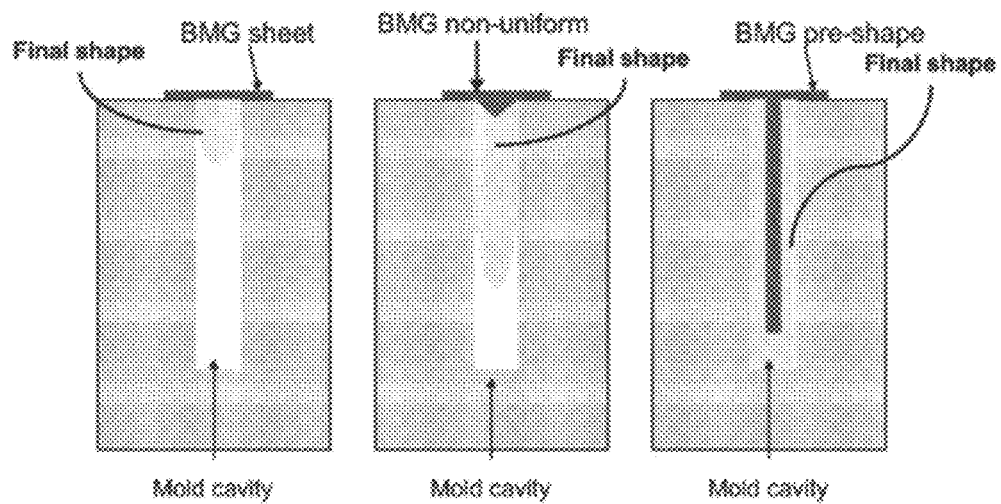
FIG. 7, provides schematics comparing different parison shapes to exemplary embodiments of the improved blow molding process of the current invention.

Specifically, as shown in FIG. 7, the current invention sets forth three basic strategies to allow for the controlled shaping of articles from supercooled liquid BMGs using a gas pressure or blow molding shaping technique that avoids the stick conditions and non-uniform thinning problems associated with the conventional methods. These techniques include engineered or pre-shaped parisons, techniques using differential heating profiles, and techniques using differential pressure gradients. Regardless of the specific technique chosen, the current invention provides a shaping process that uses a very low pressure gas or blow forming process that avoids the frictional stick forces experienced by conventional shaping techniques by engineering the expansion of a pre-shape or parison of BMG material such that substantially all of the lateral strain required to form the final article is accomplished prior to the outer surface of the parison contacting the surface of the shaping apparatus. In the context of this invention the term "substantially all lateral strain" means that at least 90% of the local lateral strain of any local volume of the parison has been accomplished prior to that portion of the parison making contact with the mold.

Figure 8A:
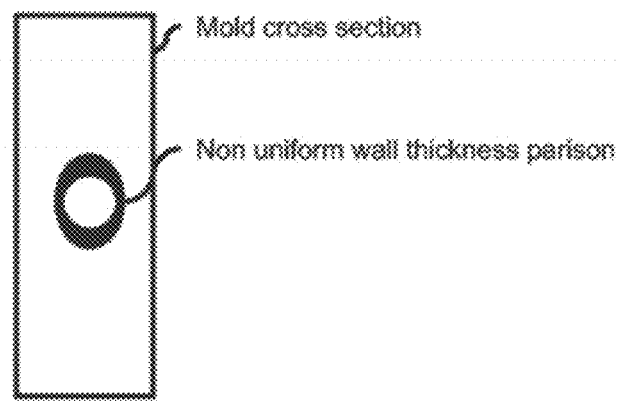
FIGS. 8a and 8b, provide schematics of the shaping process of the current invention wherein the parison contour is engineered (a), and wherein the cross-sectional thickness of the parison is engineered (b)
Figure 8B:
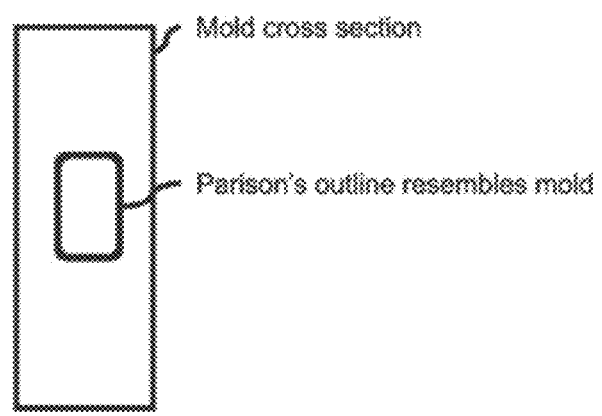

Accordingly, in a first embodiment the current invention proposes the use of a parison of BMG that has been pre-shaped, by modifying one or both of the contour and cross-sectional thickness of the parison, such that a smaller strain is required for the forming the final shape. Although specific examples will be provided in the discussion below, it should be understood that the degree to which the parison is shaped prior to expansion is solely at the discretion of the user. However, as discussed above, to ensure that the full degree of formability of the BMG can be exploited, the current invention proposes that the pre-shaped parison be formed such that all necessary local lateral strain is complete prior to the BMG material in that local area making contact with the mold wall. By necessity engineering this requirement into the parison pre-shape impact how much global or overall strain is experienced by the parison prior to the first local area of the parison contacting the mold wall. Where the cross-sectional thickness of the parison is engineered, as shown in FIG. 8a, the wall thickness distribution can be designed such that only a small overall strain is accomplished less than about 50% before some part of the BMG is in contact with the mold and the final desired thickness of the final part e.g. uniform is considered in the non-uniform initial thickness. In contrast, where only the overall contour of the parison is engineered, as shown in FIG. 8b, the majority of the global lateral strain (greater than about 70%), as calculated from Equations 2 and 3, must be accomplished prior to the parison making contact with the mold wall or the wall thickness of the final article will be non-uniform.

Figure 9A:
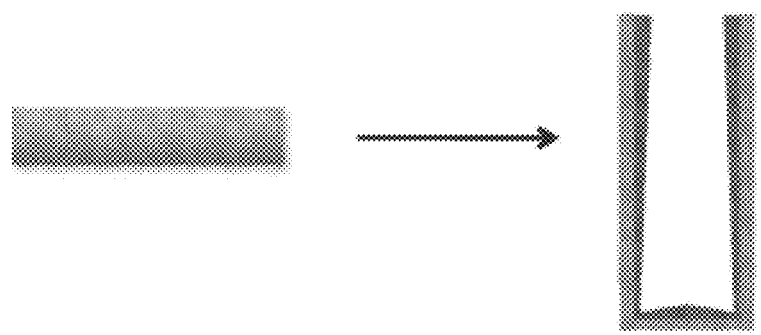
FIGS. 9a to 9d, provide schematics comparing the cross-sections of a final article formed in accordance with a conventional blow molding technique (a) and the blow molding technique in accordance to an exemplary embodiment of the current invention (b), images of final articles made in accordance with both techniques (c), and an image of a final article expanded via gas pressure in the absence of a mold (d)
Figure 9B:
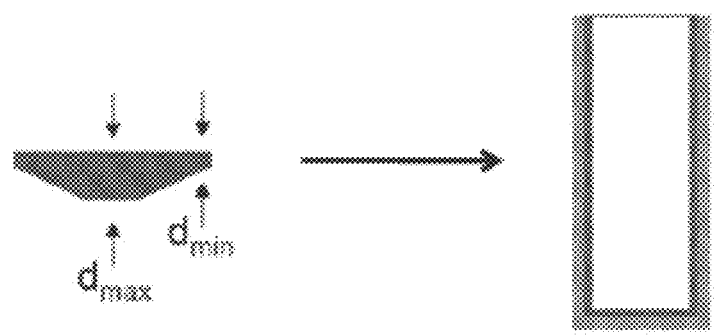
Figure 9C:
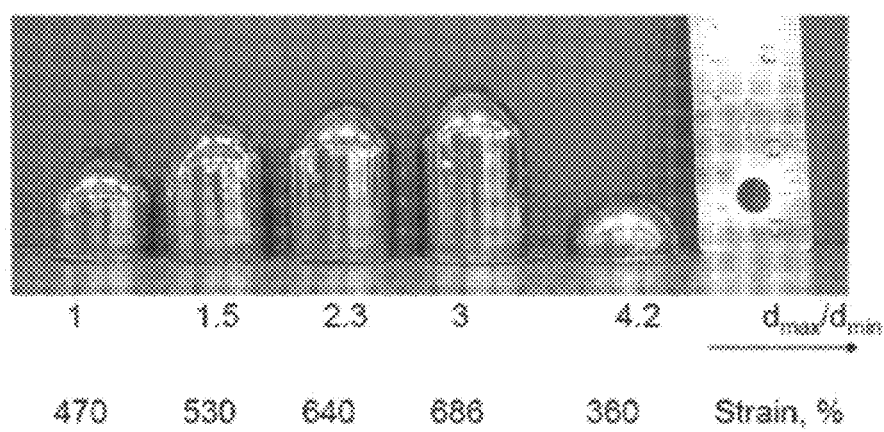
Figure 9D:
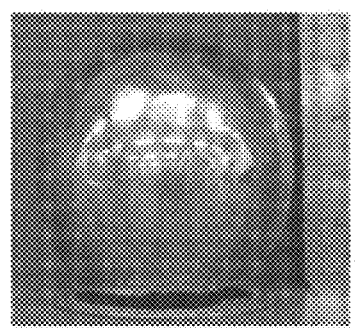
Figure 10:
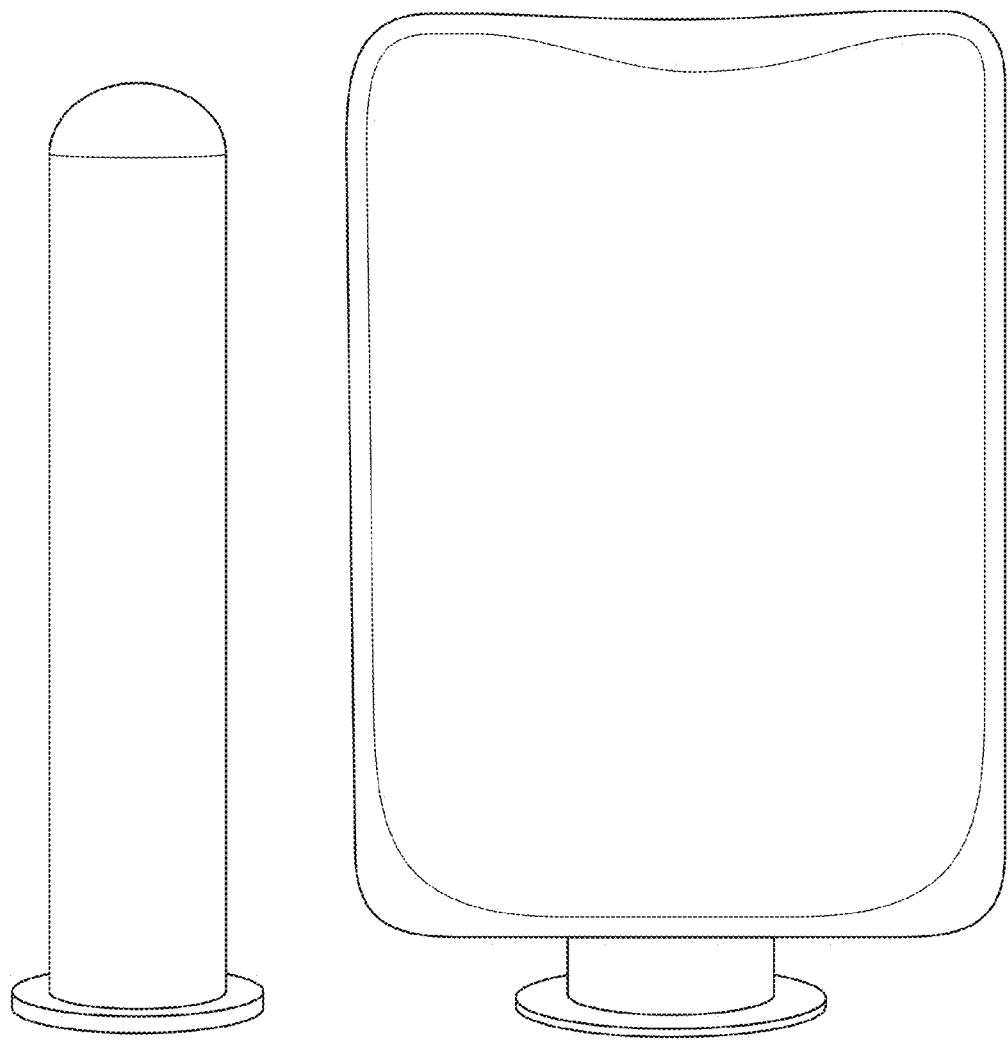
FIG. 10, provides an image of a pre-shaped parison and a final article made using the pre-shaped parison in accordance with an exemplary embodiment of the current invention.

Examples of pre-shaped parisons in accordance with the current invention are shown and discussed in relation to FIGS. 9 and 10. In a first embodiment, as shown in the cross-sectional comparisons of the final articles in FIGS. 9a and 9b, a parison or pre-shape blank of BMG having a non-uniform cross-section may be provided such that the thinning of the parison upon expansion is substantially more uniform than that obtainable from a uniform parison. FIG. 9c provides the results of experiments conducted to show the impact of this uniform expansion on the formability of the parison as well. In this series of experiments parisons made from the same material, but having different cross-sections (defined in FIG. 9b as ratio of the maximum diameter ($d_{max}$) of the parison over the minimum diameter ($d_{min}$) of the parison) were expanded in a cylindrical mold. As shown in the series of images provided in FIG. 9c, it is possible to significantly improve the aspect ratio that can be blow molded. Specifically, as shown the use of non-uniform parisons allows for deeper filling of the mold (higher aspect ratio final article). For this particular geometry the maximum filling depth is achieved for a $d_{max}$ of 2.4 mm and $d_{min}$ 0.8 mm. If $d_{max}$ is increased further for the same $d_{min}$, the sides become unstable and hence the filling depth decreases. However, it should be understood that the optimal cross-sectional thickness will depend on the shape and contour of the mold, and may be calculated as described herein, and as described above may be designed such that the final article has a substantially uniform wall thickness.

Although the use of non-uniform sheets increase the shapes that can be formed, even more extreme pre-shaped parisons can be used that allow for the production of more complex parts and with even higher aspect ratio. For example, as shown in FIG. 9c, the use of a non-uniform disc improves the overall strain obtainable from ~470% to ~686%, however, such a strain value is not limited by the material properties of the BMG being used. FIG. 9d shows the expansion of the same material under the same conditions but free from the constraints of a mold. In this experiment it was possible to access overall strains of ~1000%. Accordingly, in another embodiment of the invention, both the cross-section and the contour of the parison maybe engineered to provide for greater formability. An example of the use of a more complex pre-shaped or engineered parison in accordance with the current invention can be seen with reference to FIG. 10. As shown, in this example the desire is to shape a parison into a substantially cubical hollow shape. Using Equations 2 and 3, it is possible to calculate the overall strain required to create such a final article from a conventional disc shaped parison to be ~4500%. By pre-shaping a parison to conform more closely to the contours of the final shape it is possible to dramatically reduce the amount of non-uniform expansion that will be required. In addition, shape of the pre-shaped parison and its thickness distribution can be optimized such that after expansion into the final shape a substantially uniform thickness is achieved.

Regardless of the ultimate cross-section or contour chosen, various techniques may be used to create the pre-shaped parisons of the current invention, including, for example, direct casting from the liquid phase, powder compaction and thermoplastic forming. The advantage of direct casting techniques is that no forming time is consumed making the pre-shaped parison. As previously discuss, the time the BMG can be processed in the supercooled liquid region is limited due to the metastable nature of the BMG. Furthermore, this processing time is cumulative, meaning that when processed in multiple steps (e.g. first thermoplastic forming the pre-shaped parison and subsequent expansion) the sum of the exposure time is limited by the time to reach crystallization. (See, e.g., Schroers, J., et al., Acta Materialia, 2001. 49(14): p. 2773-2781, the disclosure of which is incorporated herein by reference.

Figure 11A:
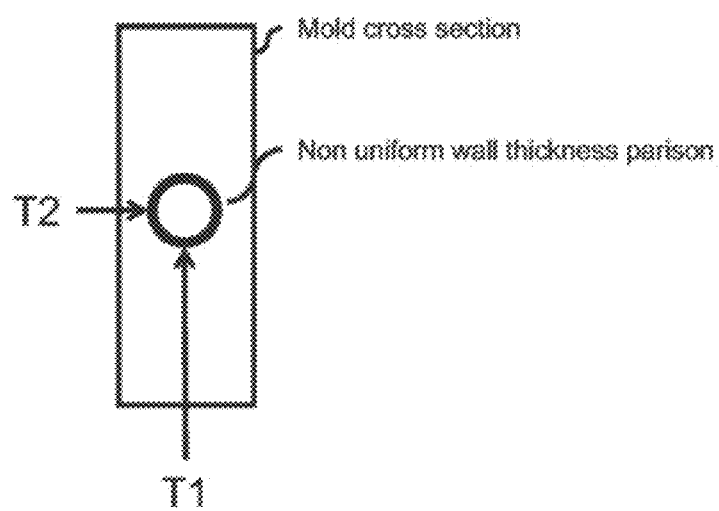
FIGS. 11a to 11c, provide a schematic of the shaping process of the current invention wherein the temperature profile of the parison during expansion is engineered (a), a cross-section of an article formed using a uniform parison and an engineered heating profile (T1<T2) in accordance with the current invention (b), and a cross-section of an article formed using a uniform parison and a uniform heating profile (c)
Figure 11B:
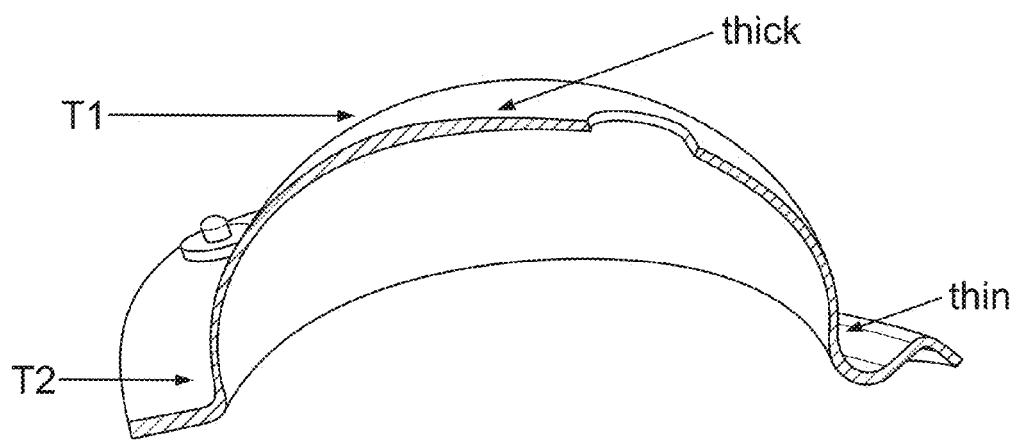
Figure 11C:
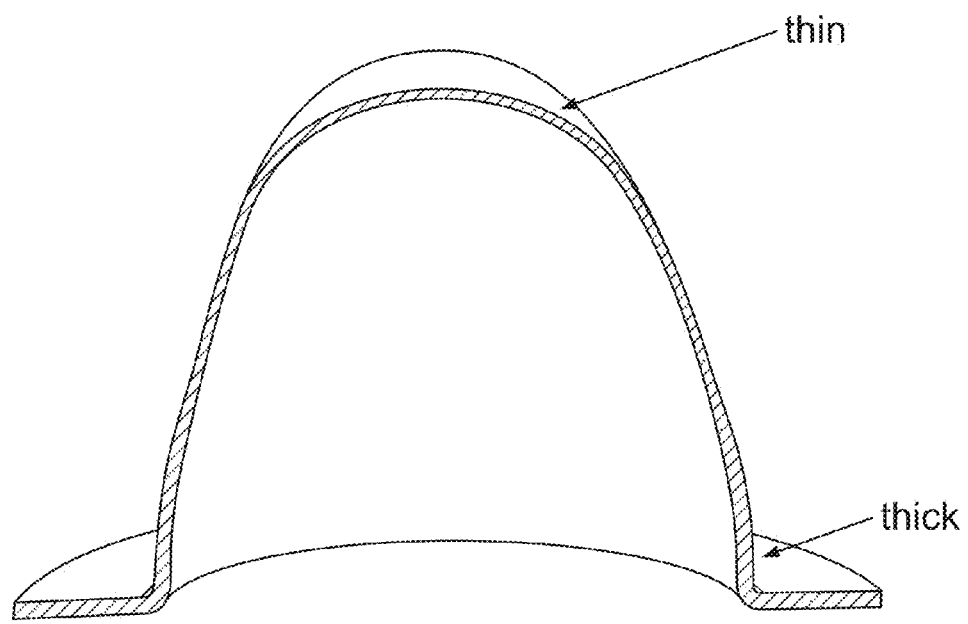

The above embodiments have discussed controlling the forming process by engineering the shape of the parison, however, because the viscosities of the BMG materials used with the current invention, and therefore the stresses required to shape those BMGs, are sensitively dependent on the temperature of the material during shaping, the strain produced at any point of the parison may also be controlled by controlling the temperature at that point of the parison, as shown in FIGS. 11a to 11c. Accordingly, in another embodiment of the invention the expansion of the parison is controlled by heating the parison differentially. In such an embodiment, the parison may start with a uniform thickness, but different portions of the parison are heated differentially (see FIG. 11a) so that the portions of the parison that must travel the furthest from the original parison shape to match the mold contour are kept at a higher temperature and the portions of the parison that do not need to travel as far to match the mold contour would be kept at a lower temperature. Again, because the viscosity and therefore strain rates required to shape these BMG materials are so sensitively dependent on temperature (typically about 2-4 times more than plastics do, see previous discussion with regard to FIGS. 4a and 4b), the viscosity of the cooler portions of the parison would be higher and therefore undergo less expansive strain, while the viscosity of the hotter portions would be lower and therefore undergo greater expansive strain. Accordingly, by balancing this differential heating it is possible to obtain a final molded article having a uniform thickness. An example of this process in action is provided in FIGS. 11b and 11c. These figures show two articles both made from a parison having a uniform cross-section. However, in FIG. 11c, an article formed using uniform heating is shown. In this typical cross section the final article has wall that are thickest at the edges and that thin in the center where the stresses are largest. As a result, the walls ultimately fail and burst under the expansion stress. In contrast, FIG. 11b shows a cross section of a uniform parison heated under a non-uniform temperature profile. As shown, in this example two expansion temperatures (T1 and T2) are used where T1<T2. The higher temperature applied to the bottom section of the article causes the edge section at the bottom to be thinner and to form faster, while the center section, where the stress of expansion is greater is thicker. The result is to allow the parison to undergo far greater strains prior to failure.

Figure 12:
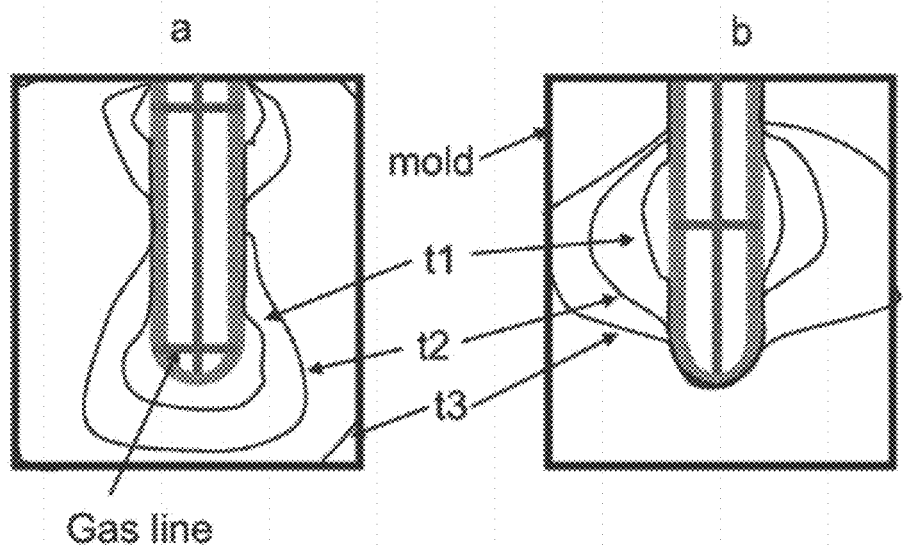
FIGS. 12a and 12b, provide schematics of the shaping process of the current invention wherein the pressure force vector applied to the parison during expansion is engineered.

The above embodiments have discussed controlling the forming process by either engineering the shape of the parison or engineering the temperature profile applied to the parison during expansion, however, because the profile of expansion of the BMG material is also determined by the stresses applied to the BMG during expansion. Accordingly, in another embodiment of the invention the expansion of the parison is controlled by applying the stress to the parison differentially. In such an embodiment, the parison may start with a uniform thickness, but the different stresses are applied to different portions of the parison (see FIGS. 12a and 12b) so that the portions of the parison that must travel the furthest from the original parison shape to match the mold contour are subject to a higher force vector from the stress source, and the portions of the parison that do not need to travel as far to match the mold contour would be subject to lower force vectors. One method of accomplishing such force vector differentials would be to provide a series of gas outlets, as shown in FIGS. 12a and 12b. In such an embodiment it would be possible to tailor the stress being applied to different portions of the parison dependent solely on the number and geometry of the gas outlets used. Although gas jets are shown in FIG. 12, it will be appreciated that it would also be possible to apply variable vacuum outlets to the external surface of the parison and obtain the same effect.

It will be apparent that using any of these techniques, it is also possible to engineer the expansion of the parison based on the desired wall thickness of the final article at each point along its contour. For example, at wall thicknesses of below 30 microns BMG materials tend to burst under the required forming pressures, thereby limiting the formable shape of any pre-shape parison. Accordingly, in an alternative embodiment the shape of the pre-shaped parison is designed to ensure a final article having a wall thickness of at least 30 microns after expansion. It is also possible to design the shape to not only ensure a specific wall thickness, but also to ensure that the wall thickness of the final article is substantially uniform. Modeling the parison shapes required for any final article shape may be done using any suitable modeling program, such as, for example, finite element modeling programs like Abaqus.

Although the above discussion has focused on the controlling expansion of the parison with regard to the ultimate mold shape, it should be understood that one of the features of the current invention is the ability to shape the parison to a final article over a wide range of strains (from below 10% to over 10,000%) using very low strain rates or stresses. The reason that this distinction is important is that these low strain rates (stresses) ensure high quality parts and allow for the creation of articles previously impracticable to form. Accordingly, it should be understood that the selection of the material and the design of the parison should also be made to ensure that low-pressure differentials may be utilized during shaping. Exemplary strain rates can be understood by reference to the pressure differential being applied to the inner and outer faces of the parison. In a preferred embodiment one face of the parison is exposed to atmospheric pressure while the other face of the parison is exposed to a vacuum of less than about $10^4$ Pa. Alternatively, the pressure differential may be formed by exposing one face of the parison to atmospheric pressure and exposing the other surface of the parison to a higher pressure than the atmospheric pressure ($10^5$ Pa) but less than about 3 MPa. In yet another alternative the pressure differential is formed by exposing one face of the parison to a vacuum of less than about $10^4$ Pa and exposing the other surface of the parison to a pressure of less than about 3 MPa. Regardless of whether a vacuum, an over-pressure, or a combination of these techniques is used, the strain rate in the parison during expansion should be sufficiently low to ensure Newtonian flow of the expanding bulk metallic glass material. Regardless of the pressure regime chosen, an inert expansion gas can be chosen to minimize oxidation during the process, such as, for example, argon or helium or mixtures of those with hydrogen.

Turning to the construction of the mold, it should be understood that the mold itself may take any form, and be made of any material capable of surviving the forming pressure at the processing temperatures used in the shaping process, such as, brass, steel, aluminum but also materials such as, for example, ceramic, plaster, polymer, epoxy and other resins materials (these materials could also be used for one time use since they are very inexpensive). Because of the low temperatures and low pressures used in the shaping method of the current invention, rapid prototyping using plaster or even plastic molds may be used. In addition, the blow molding process of the current invention allows for the use specially designed molds, such as split molds, which may be used to form final articles that are seamless hollow parts and/or that have undercuts.

Finally, although the above discussion has focused on the methods used in accordance with the current invention, the BMG material itself is critical to the successful practice of the invention. As a starting point, it is theoretically possible to use any bulk-solidifying amorphous alloy that has the capability of showing a glass transition in a Differential Scanning Calorimetry (DSC) scan in the present invention. U.S. Pat. Nos. 5,288,344; 5,368,659; 5,618,359; 5,032,196; and 5,735,975, and WIPO Publication No. WO 2004/059019 (each of which are incorporated by reference herein) disclose families of BMGs having members with properties sufficient for use with the current invention. Another set of suitable bulk-solidifying amorphous alloys are compositions based on ferrous metals (Fe, Ni, Co). Examples of such compositions are disclosed in U.S. Pat. No. 6,325,868, (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. #0.2001303218 A), incorporated herein by reference. Finally, it is also possible to use bulk amorphous alloys comprising beneficial in-situ crystalline precipitates. One exemplary case is disclosed in (C. C. Hays et. al., Physical Review Letters, Vol. 84, p 2901, 2000), which is incorporated herein by reference.

Figure 13:
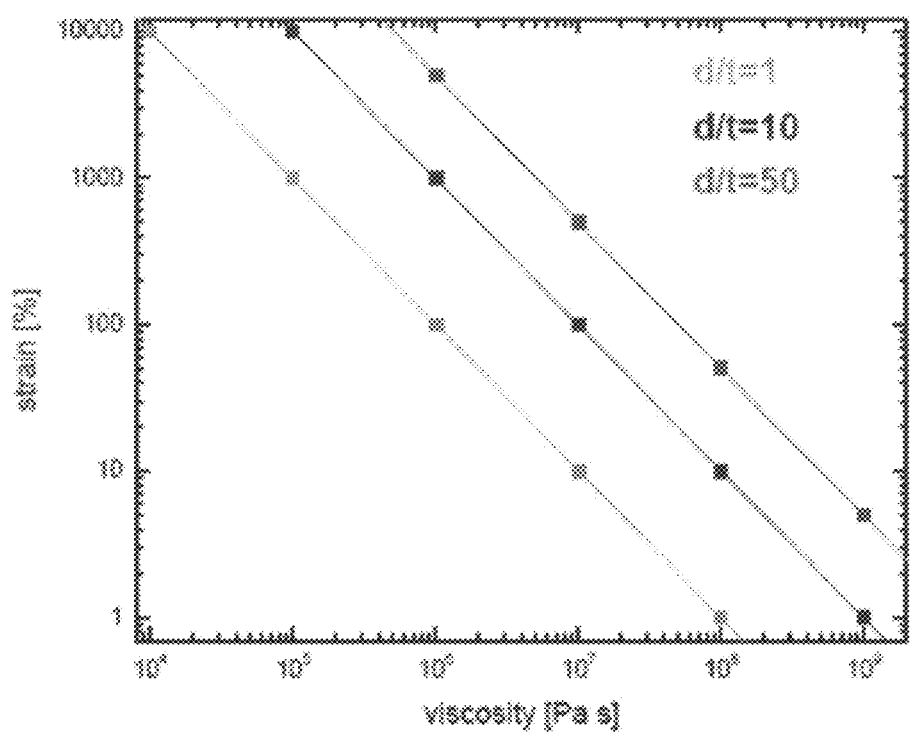
FIG. 13, provides a data graph of viscosity and strain for exemplary BMG materials.

However, to fully practice the current invention the BMG materials used should be restricted to those highly processable BMGs with low viscosities and large supercooled liquid regions. There are a number of different methods of measuring the processability of a BMG. One method uses the size of the supercooled liquid region as a proxy for processability. Under this measurement the feedstock of the BMG has a $\Delta T_{sc}$ (supercooled liquid region) of more than about 30° C. as determined by DSC measurements at 20° C./min, and preferably a $\Delta T_{sc}$ of more than about 60° C., and still most preferably a $\Delta T_{sc}$ of about 90° C. or more. Another indirect measure of processability is the critical cooling rate of the material, namely, the rate at which the BMG material must be cooled to maintain its amorphous character. In this invention it is preferred that the BMG have a critical cooling rate of less than about 100° C./sec. Yet another method is the formability characterization method, where the final diameter of a BMG of 0.1 cm³, when formed between two parallel platens under a load of 1000 lb when heated through the supercooled liquid region, has a final diameter d>7, more preferable d>10 and most preferable d>12. (See, (J. Schroers, Acta Materialia 56, p. 471 (2008), the disclosure of which is incorporated herein by reference.) Yet another way to select such materials is by reference to the viscosity of the material during processing. FIG. 13 provides a graph of the viscosity ranges required for the practice of the current invention. As shown, preferably the BMG materials used in accordance with the current invention have viscosities that can be accessed on experimental time table (~60 s) below $10^8$ Pascal·s, more preferably below $10^7$ Pascal·s, and even more preferably below $10^6$ Pascal·s. Finally, combining these parameters it is possible to provide a preferred formulation of BMG materials for use with the current invention. In accordance with the current invention, preferred materials are those BMGs having a viscosity when heated to within the supercooled liquid temperature region such that a flow stress of less than about 3 MPa may be used to achieve overall lateral strains of at least 100% prior to crystallization.

DEFINITIONS

For convenience, before further description of the present invention, certain terms employed in the specification, examples, and appended claims are collected here. These definitions should be read in light of the remainder of the disclosure and understood as by a person of skill in the art.

The term "parison" as used herein means any preformed piece of BMG material that may be expanded in a gas pressure or blow molding apparatus to make a final article.

The term "bulk metallic glass" or "amorphous alloy" or "bulk solidifying amorphous alloy" or "substantially amorphous" as used herein means a final article having at least 50% by volume of the article having an amorphous atomic structure, and preferably at least 90% by volume of the article having an amorphous atomic structure, and most preferably at least 97% by volume of the article having an amorphous atomic structure.

The term "supercooled liquid region" or "$\Delta Tsc$" is defined as the difference of $T_x$ (the onset of crystallization) and $T_g$ (the onset of glass transition) as determined from standard DSC scans at 20° C./min.

EXEMPLARY EMBODIMENTS

The person skilled in the art will recognize that additional embodiments according to the invention are contemplated as being within the scope of the foregoing generic disclosure, and no disclaimer is in any way intended by the foregoing, non-limiting examples.

One embodiment of the present system relates to the formation of net-shape articles that are not possible to form with conventional casting and molding techniques. Such articles include, for example, articles having hollow bodies, articles with high strain geometries, articles having very thin sections, articles that incorporate undercuts, multiple scales, or multiple components, articles that have non-uniform cross-sections, and combinations thereof. For example, the current invention proposes the formation of articles having thin walls of less than 1 mm, or where the wall thickness is less than 1/40 of the lateral dimension of the final part.

Figure 14A:
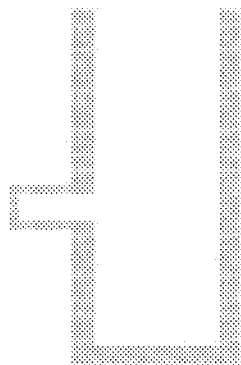
FIGS. 14a to 14c, provide schematics of exemplary articles that can be made in accordance with the technique of the current invention.
Figure 14B:
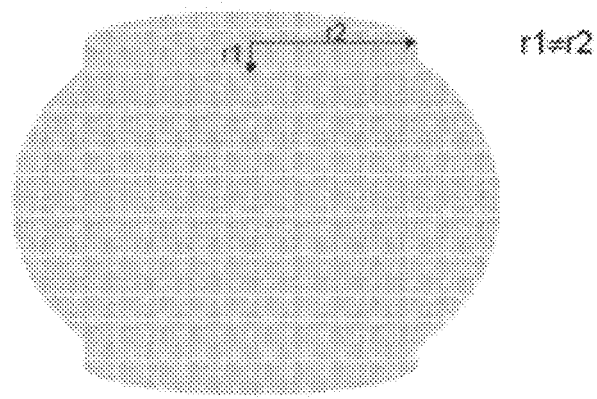
Figure 14C:
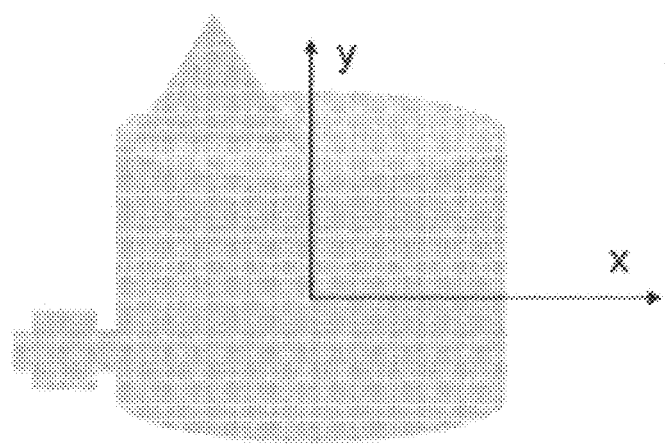
Figure 15A:
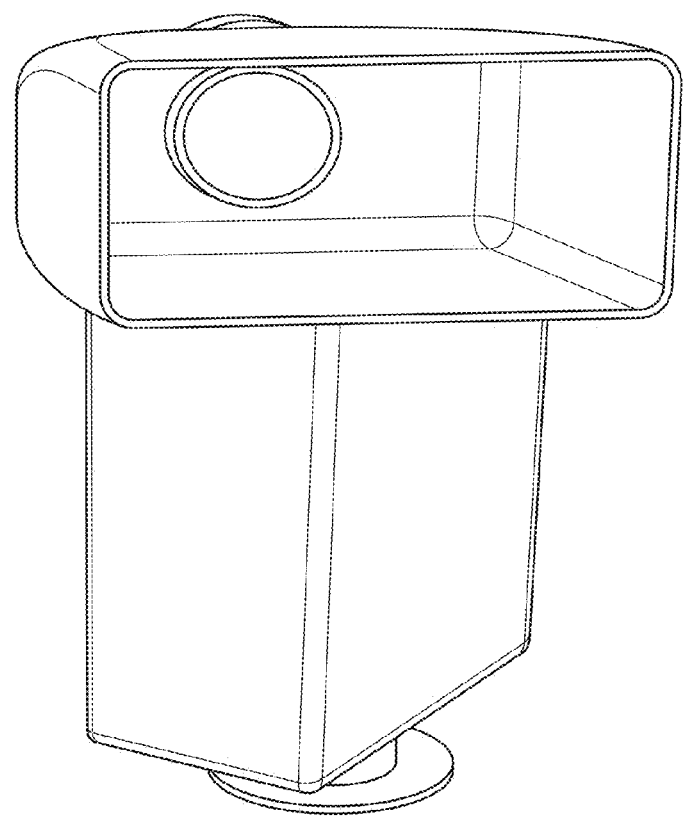
FIGS. 15a and 15b, provide images of parts incorporating features of the articles shown in the schematics of FIGS. 14a to 14c made using the process of the current invention.
Figure 15B:
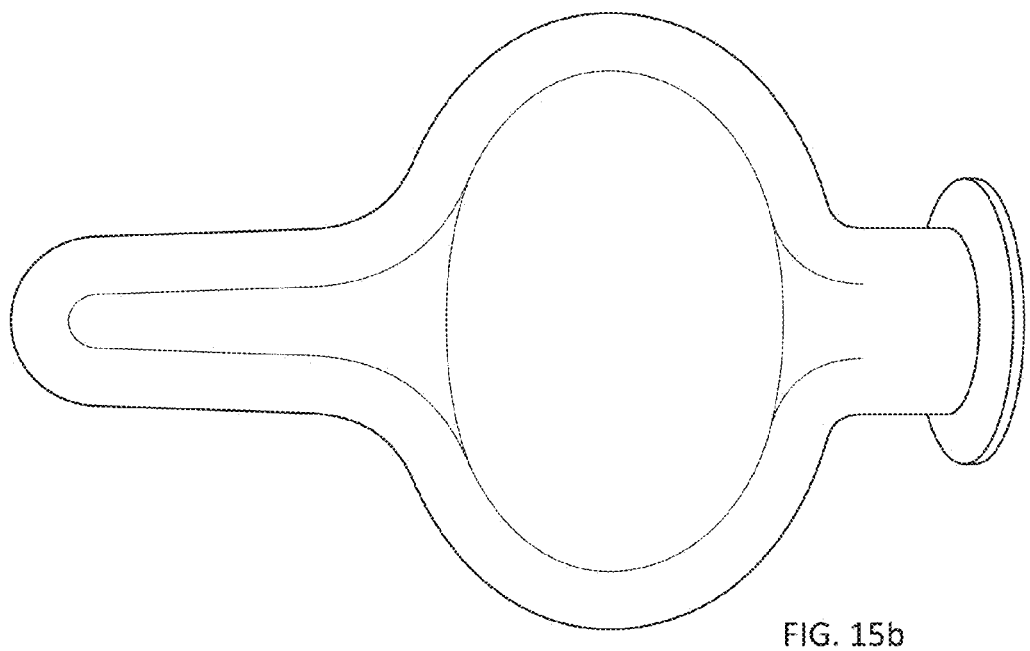

Schematic diagrams of some exemplary shapes that are not possible to form using conventional metal shaping techniques, but that are accessible using the inventive gas pressure method of the current invention, are provided in FIGS. 14a to 14c. FIG. 14a shows a schematic of an article having a standard undercut. FIG. 14b shows a schematic of an article having non-symmetric radii around its circumference. Finally, FIG. 14c provides a schematic of an article having symmetry along neither its x nor y-axes. None of these shapes are possible with conventional techniques. For example, spinning techniques require a rotational symmetry about at least one axis, it is not possible to create any undercuts using drawing techniques, and while such shapes are theoretically possible using casting techniques only thick walled objects can be created. In contrast, FIGS. 15a and 15b provide photographic evidence of thin-walled complex net-shape articles having these undercut and non-symmetric features made in accordance with the current invention.

In another embodiment, the current invention also relates to incorporating or joining other BMG parts or conventional metal or non-metal pieces into the BMG article formed in accordance with the current invention. It is generally considered difficult to incorporate or join non-BMG materials or objects into BMG articles. This stems from the fact that the formation steps for creating such an incorporation or joint have, in conventional techniques, also required quick cooling to avoid crystallization (which significantly degrades the BMG properties). (See, e.g., Swiston, A. J., et al., Scripta Materialia, 2003. 48(12): p. 1575-1580; and Swiston, A. J., et al., Acta Materialia, 2005. 53(13): p. 3713-3719, the disclosures of which are incorporated herein by reference.) Using the gas pressure shaping technique of the current invention it is possible to form an incorporation or joint between a BMG article and another material by mechanically interlocking the two materials. The key improvement is that in the current technique the BMG fills into an undercut with the part to be incorporated or joined to form a mechanical interlock. In order to use the low forming pressures associate with the current technique (<3 MPa), the span of the undercut should be larger than twice the thickness of the BMG material at this location; however, if a narrower undercut is desired it is possible to form such an undercut using the normal strain component of the expansion, but this is typically limited to undercuts of about 100 microns or less. Narrow undercuts can also be produced by high pressure. In such an embodiment, a suitable high pressure forming technique may be used, such as, for example, through compression molding techniques.

Figure 16A:
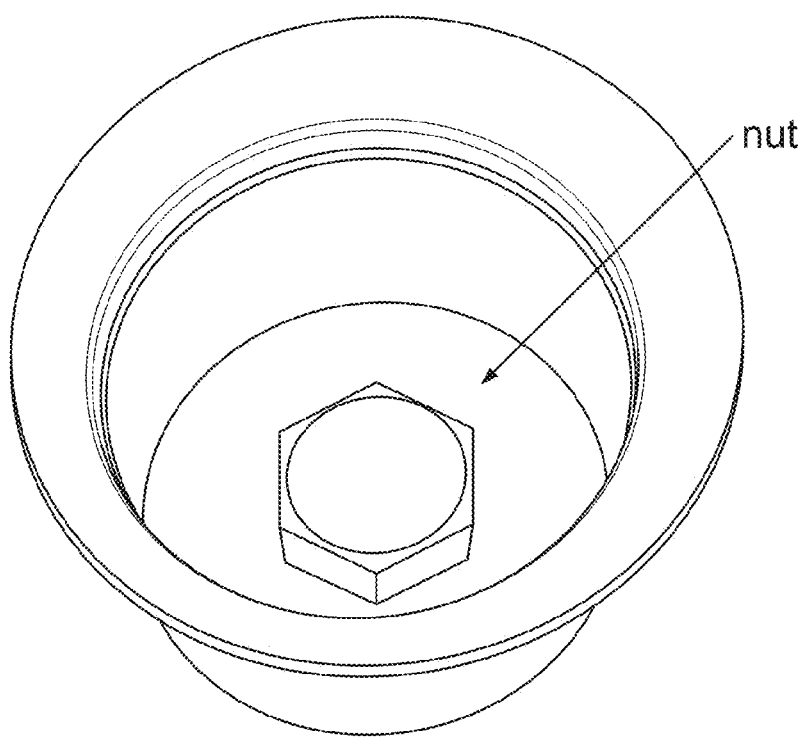
FIGS. 16a and 16b, provide images of BMG parts made to either join or incorporate non-BMG materials in accordance with the current invention.
Figure 16B:
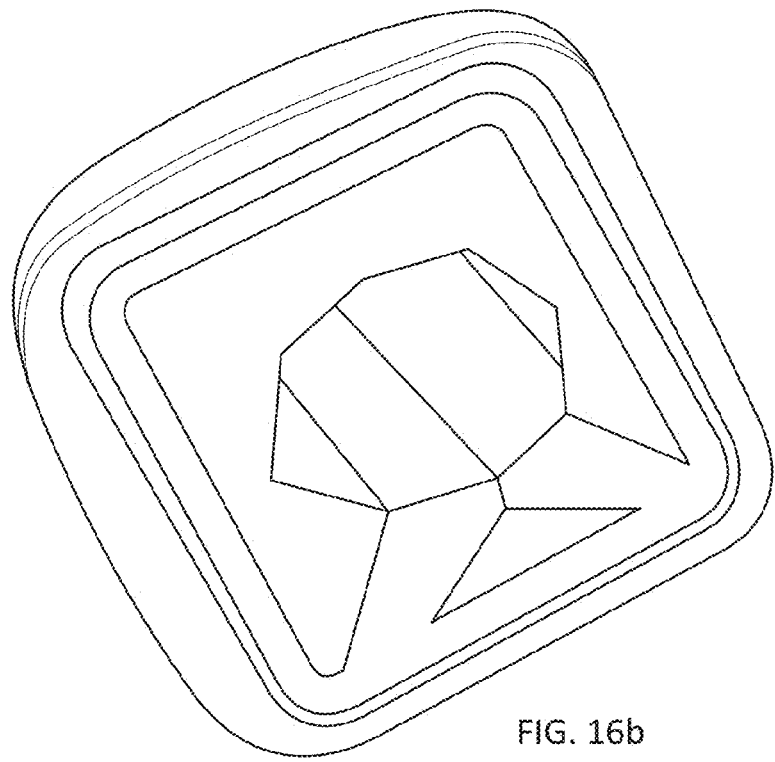

Some examples of the incorporation/joining technique of the current invention in operation are shown in FIGS. 16a and 16b. As shown in these examples, it is possible to incorporate or join other metallic parts, such as screws to the BMG part (FIG. 16a), or non-metallic parts such as gemstones (FIG. 16b). With regard to the embodiment shown in FIG. 16b, it should be noted that since the processing temperatures for most BMGs are below 500° C. this allows one to set most gemstones, including diamonds, into the BMG article.

Figure 17A:
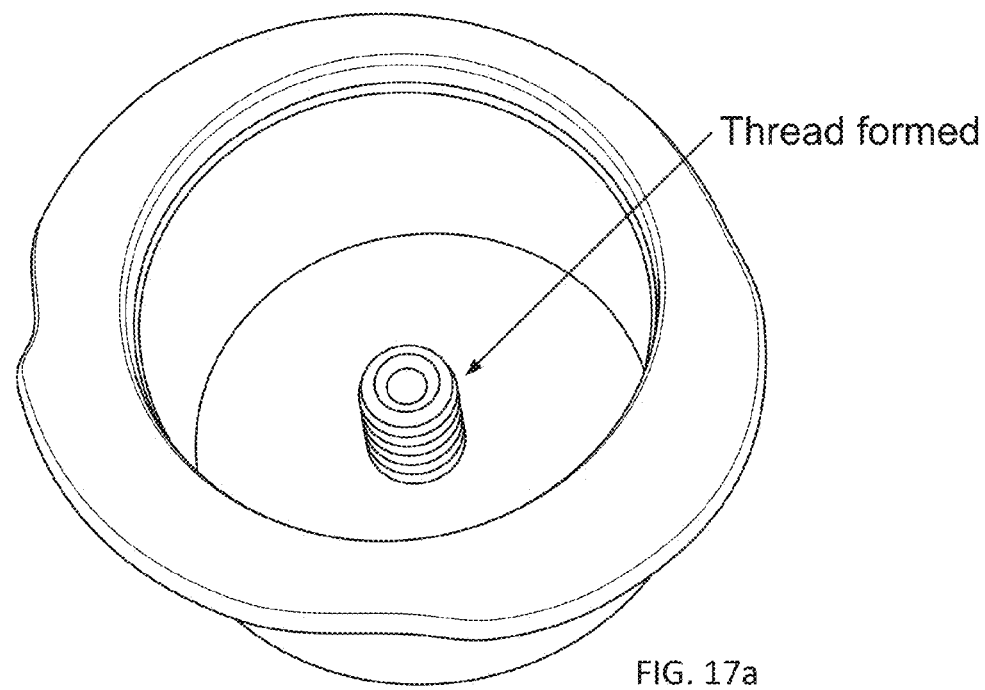
FIGS. 17a and 17b, provide images of threads formed in accordance with the process of the current invention.
Figure 17B:
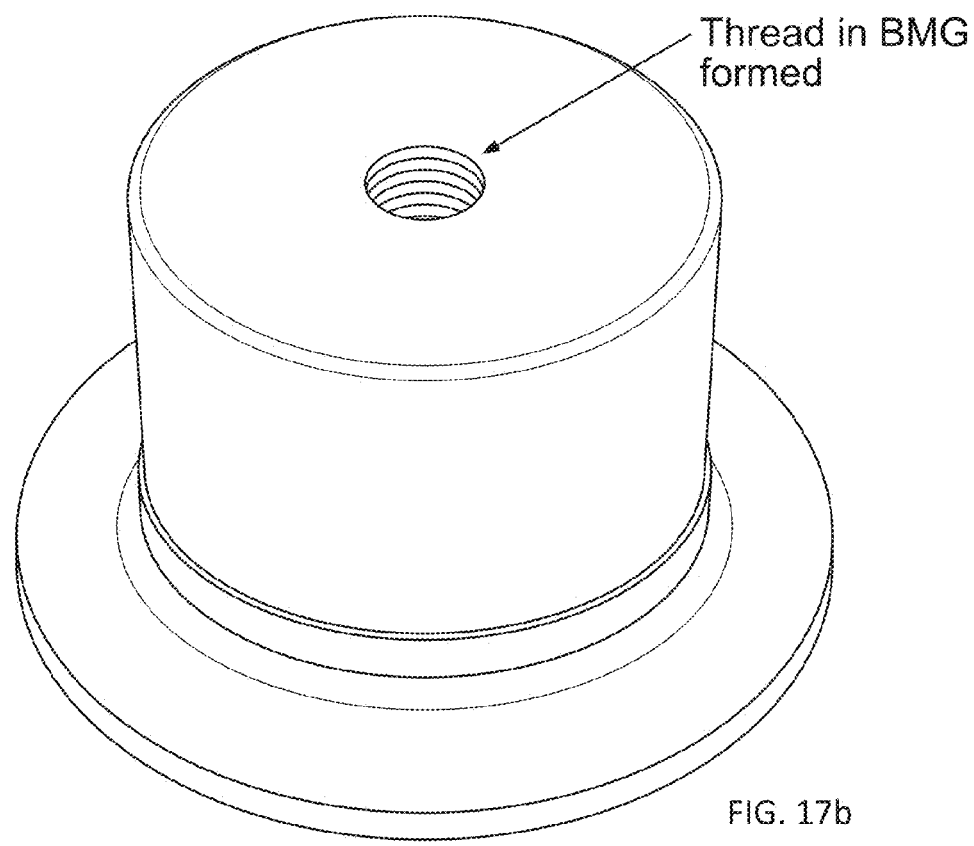

In addition to the ability to mechanically interlock parts using the current invention, it is also possible to mechanically interlock parts by forming the mechanical interlock features themselves. For example, as shown in FIGS. 17a and 17b, it is possible to form threads in the final article (FIG. 17a) by blow molding the material around a thread (FIG. 17b) having the desired thread characteristics and subsequently removing the thread. Alternatively, the BMG can also be blow molded into a threaded hole and upon removing the mold it can act as a threaded rod. In the same way nuts can be interlocked. Using the same technique it would also be possible to form locator holes or pins into final articles as well.

Figure 18:
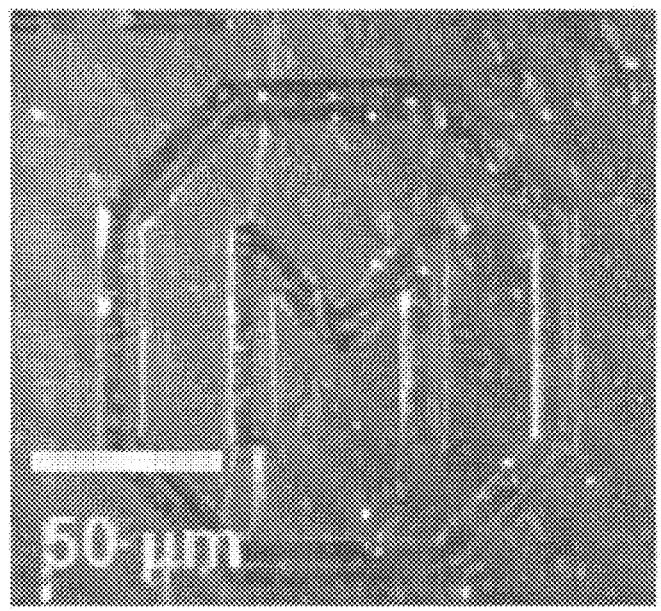
FIG. 18, provides an image showing the surface replication of fine features in accordance with the current invention.

Finally, the gas pressure shaping technique of the current invention permits net-shaping of parts including a wide range of length scales from over 10 cm to about 20 nm. Since no first order phase transition occurs and also no fast cooling is required to avoid crystallization precise replication of the mold cavity can be expected. Moreover, since the fine replication of the surface features of any mold are reproduced by application of normal strain (deformation of the BMG material parallel to the load direction) it is possible to apply an additional normal strain even after the lateral expansion or strain of the parison has ceased thereby allowing for the production of a good surface finish. For example, an application of 10% additional normal strain applied to the BMG material once in contact with the mold surface allows for the reproduction of small features using the current blow molding technique even under the low pressures used herein. FIG. 18 provides an exemplary embodiment of the technique in which the surface features of a mold on the scale of 10 µms has been reproduced using the blow molding technique of the current invention. It should also be understood that this technique could be used to chemically, optically, or biologically "functionalize" the surface of the final article with micron or nanoscale features.

Combining the above embodiments, it becomes clear that the current invention provides a technique that can form complex, thin-walled, precision, multi-scale, net-shape parts and components from BMG materials.

EXAMPLES

Methods and Materials

To verify the amorphous structure of the materials before and after blow forming, X-ray diffraction (XRD) and differential scanning calorimetery (DSC) results of the blow-molded article were used. This characterization was carried out for all blow-molded BMG specimens. Thermal analysis was performed using a Perkin Elmer diamond differential scanning calorimeter (DSC), and X-ray diffraction (XRD) was carried out on a Shimadzu Lab-x, XRD-6000 diffractometer using CuKa radiation.

Example 1

Forming Pressure Study

Figure 19:
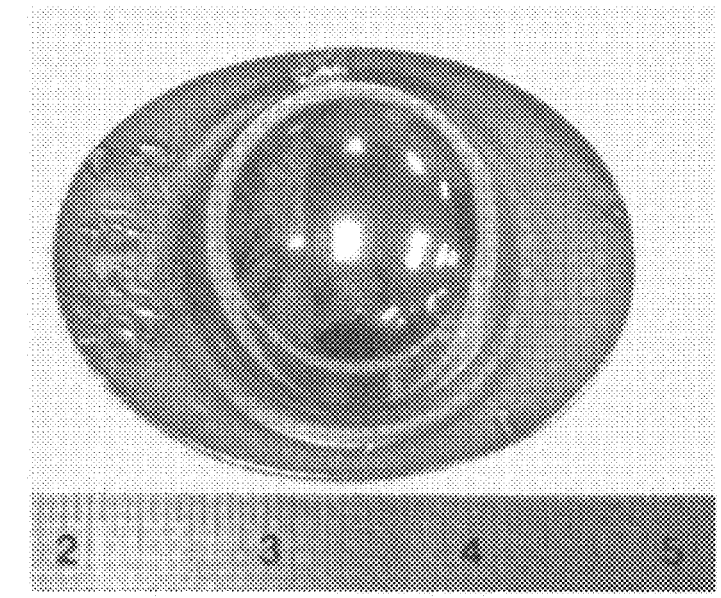
FIG. 19, provides an image of a part made via gas pressure expansion in accordance with an exemplary embodiment of the current invention.
Figure 19:
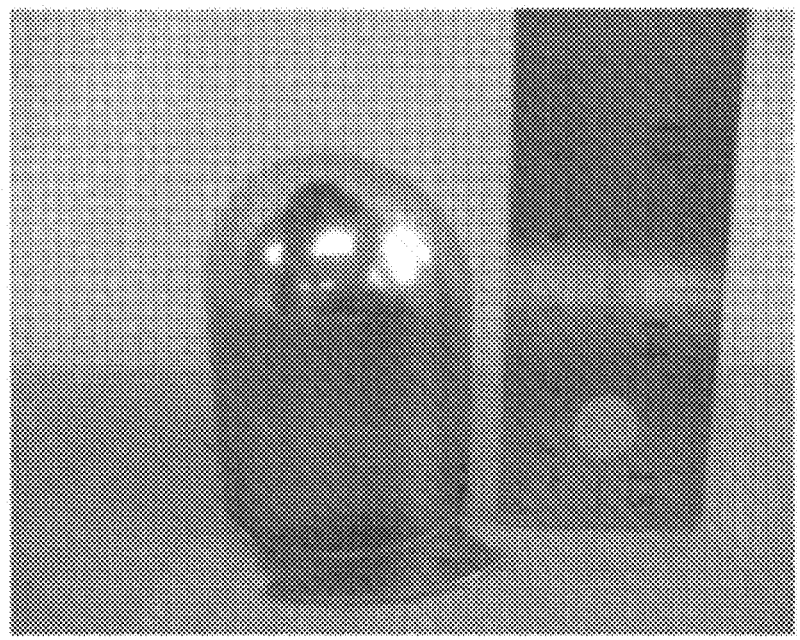

The forming pressures required in the blow molding of a BMG in its supercooled liquid region in accordance with the current invention is demonstrated in FIG. 19. In this study, a 0.8 mm thick $Zr_{44}Ti_{11}Cu_{10}Ni_{10}Be_{25}$ disk was formed through a circular opening of 4 cm at a temperature of 460° C. The disk section covering the opening was formed into a hemisphere under a pressure, which was generated with the sole power of the human lung (~$10^4$ Pa). The forming process took less than 100 s, which corresponds to a strain rate of $\geq 10^{-2}$ s$^{-1}$. At the 460° C. processing temperature used in this study, crystallization becomes detectable after 255 s compared with the processing time of 100 s. (See, T. Waniuk, J. Schroers, W. L. Johnson, Physical Review B, 67 (2003) 184203, the disclosure of which is incorporated herein by reference.) The cross-sectional area revealed some thinning of the material. For example, at the edge of the opening the material is 0.72 mm thick compared with its minimum value of 0.69 mm at its pole. However, this example does demonstrate that a strains of ~400% can be produced in BMG articles with very low strain rates.

The sample depicted in FIG. 19 is in its as blow-molded state and no subsequent surface treatment was carried out. This also demonstrates the excellent surface finish achievable with this technique even when processing in air. Most SPF metals demonstrate some roughening of the surface, as a result of grain boundary sliding being the principle deformation mechanism at these strain rates and temperatures. However, in BMGs deformation takes place on the nanoscale, resulting in minimal surface roughening. (See, e.g., A. S. Argon, Acta Metallurgica 27 (1979) 47-58, the disclosure of which is incorporated herein by reference.)

Example 2

Mold Forming Study

Figure 20:
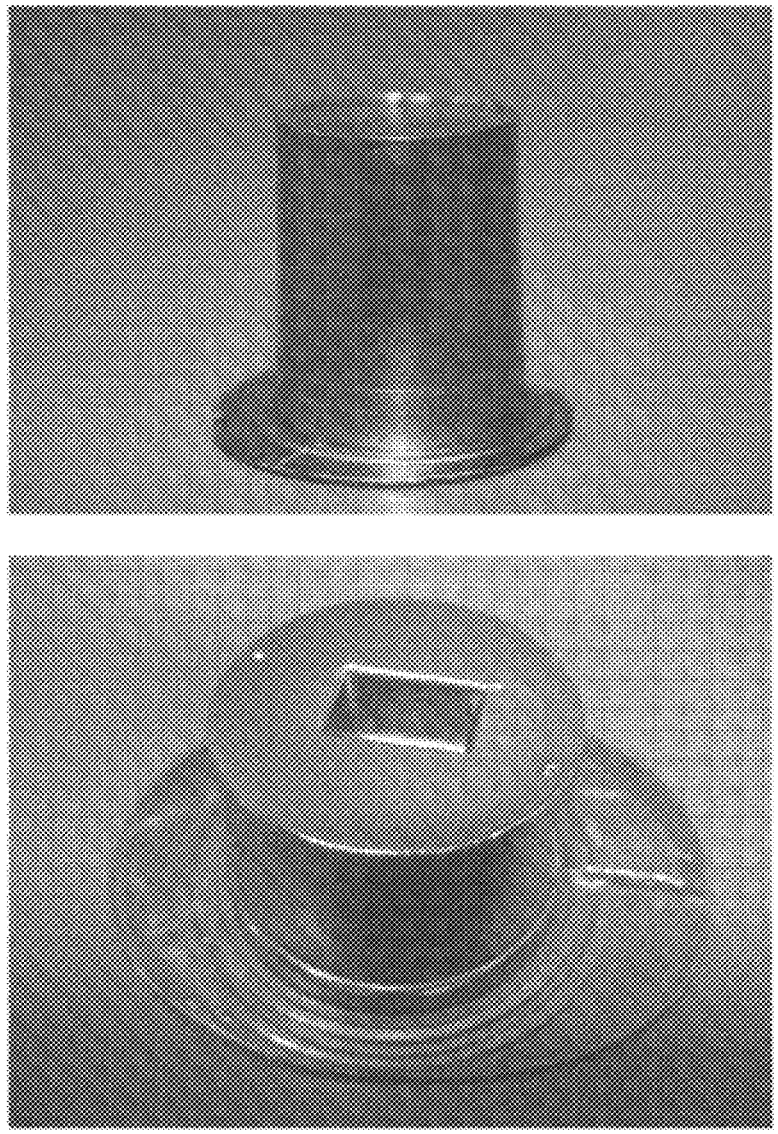
FIG. 20, provides images of parts made via gas pressure expansion in accordance with an exemplary embodiment of the current invention.

FIG. 20 depicts two net-shaped parts that were processed by heating a blank of $Zr_{44}Ti_{11}Cu_{10}Ni_{10}Be_{25}$ to 460° C. and applying a pressure gradient of $2\times10^5$ Pa (0.2 MPa) for ~40 s. As shown, this study demonstrates that complicated geometries net-shape parts can be replicated with this technique.

Example 3

Replication of Surface Features

Figure 21:
FIG. 21, provides an image of a part made via gas pressure expansion into a plaster mold in accordance with an exemplary embodiment of the current invention.
Figure 21:

FIG. 21 demonstrates both that small features can be replicated using the gas pressure shaping technique of the current invention and that plaster molds may be used. Specifically, in this example a blank of BMG was expanded into a plaster mold. The top image shows the front of the final article formed in accordance with this method, and the bottom image back of the final article formed in accordance with this method. As shown, the smallest features in the mold can be replicated over a large area with this technique even with such low forming pressures.

SUMMARY

The large achievable strains and the high surface finish of the articles formed in accordance with the gas pressure forming method of the current invention, even when processed in air at low pressure, together with the ability to form complex, thin-walled, precision, multi-scale, net-shape parts and components and accurately replicate fine surface features indicates the potential of this process for commercial energy-efficient net-shaping of BMG articles.

Those skilled in the art will appreciate that the foregoing examples and descriptions of various preferred embodiments of the present invention are merely illustrative of the invention as a whole, and that variations in the steps and various components of the present invention may be made within the spirit and scope of the invention. For example, it will be clear to one skilled in the art that additional processing steps would not affect the improved properties of the blow molding method of the current invention nor render the method or the articles made therefrom unsuitable for their intended purpose. Accordingly, the present invention is not limited to the specific embodiments described herein but, rather, is defined by the scope of the appended claims.

What is claimed is:

1. A method of shaping a bulk metallic glass comprising:
providing a preformed parison of bulk metallic glass, said parison having inner and outer faces;
providing a mold defining an internal cavity;
placing said parison into shaping alignment with the mold such that the outer face of the parison is exposed to the internal cavity of the mold and the internal cavity of the mold is sealed off from the external environment;
heating said parison to a temperature within the supercooled liquid region of the bulk metallic glass material;
applying a pressure differential between the inner and outer faces of the parison such that the parison expands to form a final article that conforms to the contour of the internal cavity of the mold, wherein the preformed parison is configured to ensure that substantially all of the local lateral strain experienced by any portion of the outer surface of the parison during expansion occurs prior to this portion of the outer face of the parison coming into contact with the mold; and cooling the final article to below the glass transition temperature of the bulk metallic glass material at rate such that final article remains substantially amorphous.

2. The method of claim 1, wherein the strain rate in the parison during expansion is sufficiently low to ensure Newtonian flow of the bulk metallic glass material.

3. The method of claim 1, wherein the contour of the preformed parison is designed to control the thickness of the walls of the final article.

4. The method of claim 3, wherein the contour of the preformed parison is designed to ensure that the thicknesses of the walls of the final article are approximately uniform.

5. The method of claim 4, wherein the overall strain of the parison is less than 50% prior to any point of the parison making contact with the outer surface of the mold.

6. The method of claim 1, wherein the cross-sectional thickness of the preformed parison is designed to control the thickness of the walls of the final article.

7. The method of claim 6, wherein the cross-sectional thickness of the preformed parison is designed to ensure that the thicknesses of the walls of the final article are approximately uniform.

8. The method of claim 7, wherein the overall strain of the parison is at least 70% prior to any point of the parison making contact with the outer surface of the mold.

9. The method of claim 1, wherein the step of heating the parison includes differentially heating portions of said parison such that the parison expands non-uniformly to control the thickness of the walls of the final article.

10. The method of claim 9, wherein the heat is applied such that the thicknesses of the walls of the final article are approximately uniform.

11. The method of claim 1, wherein the at least 90% of the local lateral strain of any portion of the parison has been accomplished prior to that portion of the parison making contact with the mold.

12. The method of claim 1, wherein the final article has a wall thickness that is less than 1 mm.

13. The method of claim 1, wherein the final article has a wall thickness that is less than 1/40 of the lateral dimension of the final article.

14. The method of claim 1, wherein the overall lateral strain during expansion exceeds 100% prior to the outer face contacting the mold.

15. The method of claim 1, wherein the overall lateral strain during expansion exceeds 500% prior to the outer face contacting the mold.

16. The method of claim 1, wherein the pressure differential is formed by exposing the inner face of the parison to atmospheric pressure and exposing the outer face of the parison to a vacuum of less than about $10^4$ Pa.

17. The method of claim 1, wherein the pressure differential is formed by exposing the outer face of the parison to atmospheric pressure and exposing the inner surface of the parison to a pressure of less than about 3 MPa.

18. The method of claim 1, wherein the pressure differential is formed by exposing the outer face of the parison to a pressure of less than about $10^4$ Pa and exposing the inner surface of the parison to a pressure of less than about 3 MPa.

19. The method of claim 1, wherein the gas used during the expansion is an inert gas selected from the group consisting of helium and argon.

20. The method of claim 1, wherein the bulk metallic glass material has a viscosity when heated to within the supercooled liquid temperature region such that a flow stress of less than about 3 MPa may be used to achieve overall lateral strains of at least 100% prior to crystallization.

21. The method of claim 20, wherein the viscosity of the bulk metallic glass material in the within the supercooled liquid temperature region of less than about $10^8$ Pa·s can be accessed for at least one minute before crystallization.

22. The method of claim 20, wherein the viscosity of the bulk metallic glass material in the within the supercooled liquid temperature region of less than about $10^7$ Pa·s can be accessed for at least one minute before crystallization.

23. The method of claim 20, wherein the viscosity of the bulk metallic glass material in the within the supercooled liquid temperature region of less than about $10^6$ Pas·s can be accessed for at least one minute before crystallization.

24. The method of claim 1, wherein the step of expanding takes place in a processing time of at least 5 s.

25. The method of claim 1, wherein the step of cooling further comprises cooling the final article at a rate of less than about 10° C./sec below to a temperature below the glass transition temperature.

26. The method of claim 1, wherein the step of cooling further comprises cooling the final article at a rate of less than about 0.3° C./sec below to a temperature below the glass transition temperature.

27. The method of claim 1, wherein the final article has at least one characteristic selected from the group consisting of hollow bodied, undercut, nonuniform cross section, and features on multiple length scales.

28. The method of claim 1, wherein the internal cavity of the mold splits apart and where the final article is a seamless hollow part.

29. The method of claim 1, wherein the internal cavity of the mold splits apart and where the final article has at least one undercut.

30. The method of claim 1, wherein at least one second non-bulk metallic glass part is incorporated into the bulk metallic glass material during the shaping.

31. The method of claim 30, wherein the at least one second nonbulk metallic glass part are designed to functionalize the surface of the final article.

32. The method of claim 30, wherein the step of incorporation is used to join the bulk metallic glass parison to the non-bulk metallic glass material.

33. The method of claim 32, wherein the non-bulk metallic glass material is selected from the group consisting of gemstones, carbide, nitrides, refractory, carbon and polymers.

34. The method of claim 32, wherein the non-bulk metallic glass material is a lubricant.

35. The method of claim 32, wherein the non-bulk metallic glass material is a wear resistant material.

36. The method of claim 30, wherein step of incorporation is used to gas pressure form threads into the bulk metallic glass material of the final article.

37. The method of claim 30, wherein step of incorporation is used to form locator holes or locator pins into the bulk metallic glass material of the final article.

38. The method of claim 1, wherein the normal strain applied to the parison upon contact with the walls of the internal cavity of the mold is sufficient to ensure reproduction of the surface features of the internal cavity.

39. The method of claim 38, wherein at least a portion of the surface features of the mold have a size scale of less than about 10 μm.

40. The method of claim 38, wherein no more than a 30% local normal strain is applied to the parison upon contact with the walls of the internal cavity of the mold.

41. The method of claim 1, wherein the internal cavity of the mold is made from a material selected from the group consisting of ceramic, plaster, polymer, glass, epoxy and other resins.

42. The method of claim 1, wherein during the expansion of the parison differential stresses are applied at a plurality of points along the parison to control the thickness of the walls of the final article.

43. The method of claim 42, wherein the differential stresses are designed to ensure that the thicknesses of the walls of the final article are approximately uniform.

44. The method of claim 42, wherein the differential stresses are applied via a plurality of gas outlets disposed in fluid communication with the parison.

\* \* \* \* \*